United States Patent
Jiang et al.

(10) Patent No.: US 12,413,879 B2
(45) Date of Patent: Sep. 9, 2025

(54) OPTICAL DISTRIBUTION NETWORK, OPTICAL NETWORK SYSTEM, SPLITTER, AND METHOD FOR IDENTIFYING PORT OF SPLITTER

(71) Applicant: Huawei Technologies Co., Ltd., Shenzhen (CN)

(72) Inventors: Hengyun Jiang, Chengdu (CN); Chao Jin, Dongguan (CN); Bo Wu, Chengdu (CN); Ning Deng, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 243 days.

(21) Appl. No.: 18/324,374

(22) Filed: May 26, 2023

(65) Prior Publication Data

US 2023/0300501 A1    Sep. 21, 2023

Related U.S. Application Data

(63) Continuation of application No. PCT/CN2021/111612, filed on Aug. 9, 2021.

(30) Foreign Application Priority Data

Nov. 27, 2020  (CN) .......................... 202011358792.1

(51) Int. Cl.
*H04Q 11/00* (2006.01)
*H04J 14/02* (2006.01)

(52) U.S. Cl.
CPC ...... *H04Q 11/0067* (2013.01); *H04J 14/0212* (2013.01)

(58) Field of Classification Search
CPC .................................................. H04Q 11/0067
See application file for complete search history.

(56) References Cited

U.S. PATENT DOCUMENTS 6,512,614 B1 *  1/2003  Saleh ................. H04Q 11/0062
                                                        398/47
10,200,144 B1 *  2/2019  Chowdhury ........ H04J 14/0305
(Continued)

FOREIGN PATENT DOCUMENTS

CN      102118658 A    7/2011
CN      102439998 A    5/2012
(Continued)

OTHER PUBLICATIONS

Xuan Zhang et al, "Remote Coding Scheme Using Cascaded Encoder for PON Monitoring", IEEE Photonics Technology Letters ( vol. 28, Issue: 20). DOI:10.1109/LPT.2016.2586965, Oct. 15, 2016, total 4 pages.

*Primary Examiner* — Shi K Li
(74) *Attorney, Agent, or Firm* — Slater Matsil, LLP

(57) ABSTRACT

An optical distribution network, an optical network system, a splitter, and a method for identifying a port of the splitter are provided. The optical distribution network includes a splitter, a first optical filter, and a first power change assembly. The splitter includes at least two output ports, each output port corresponds to at least one first optical filter, different output ports correspond to different first optical filters, and center wavelengths of detection light that the different first optical filters allow to pass through or do not allow to pass through are different. Each output port of each splitter in an $N^{th}$-level splitter corresponds to the first power change assembly, and the first power change assembly is configured to change a power of first service light based on received first detection light.

20 Claims, 13 Drawing Sheets

(56) References Cited

U.S. PATENT DOCUMENTS

| | | |
|---|---|---|
| 2012/0263458 A1 | 10/2012 | Wen et al. |
| 2014/0270772 A1 | 9/2014 | Lutgen et al. |
| 2015/0125153 A1* | 5/2015 | Lee ................ H04B 10/07957 398/79 |
| 2015/0280815 A1* | 10/2015 | Kobayashi ........... H04B 10/278 398/25 |
| 2018/0219627 A1 | 8/2018 | Schemmann et al. |
| 2023/0155688 A1* | 5/2023 | Cavaliere ............. H04B 10/614 398/204 |

FOREIGN PATENT DOCUMENTS

| | | |
|---|---|---|
| CN | 111327975 A | 6/2020 |
| CN | 112653939 A | 4/2021 |
| EP | 1986350 A1 | 10/2008 |
| JP | 2014103600 A | 6/2014 |

* cited by examiner

OPTICAL DISTRIBUTION NETWORK, OPTICAL NETWORK SYSTEM, SPLITTER, AND METHOD FOR IDENTIFYING PORT OF SPLITTER

CROSS-REFERENCE TO RELATED APPLICATIONS

This application is a continuation of International Application No. PCT/CN2021/111612, filed on Aug. 9, 2021, which claims priority to Chinese Patent Application No. 202011358792.1, filed on Nov. 27, 2020. The disclosures of the aforementioned applications are hereby incorporated by reference in their entireties.

TECHNICAL FIELD

This application relates to the field of optical communication technologies, and in particular, to an optical distribution network, an optical network system, a splitter, and a method for identifying a port of the splitter.

BACKGROUND

With the development of communication technologies, a passive optical network (PON) system is more and more widely used in an optical communication technology. The PON system mainly includes an optical line terminal (OLT), a plurality of optical network terminals (ONTs), and an optical distribution network (ODN) that connects the OLT and the ONTs. The OLT is a central office device of telecommunications, and is located at a central office in a PON network. The ONT, also referred to as an "optical modem", is a termination unit of the PON network. The ODN may provide an optical signal transmission channel between the OLT and the ONT. The ODN does not include any electronic component or electronic power supply. The ODN mainly includes passive components such as a splitter and fibers, with no need to include an active electronic device. The PON network may flexibly support various topology structures such as a tree topology, a star topology, and a bus topology.

The PON network has features such as wide coverage, a large quantity of branch optical paths, and passivity. After the ODN network is put into operation, a topology connection relationship of the ODN network cannot be intuitively determined because ports of a splitter in the ODN network that are connected to ONTs are invisible, in other words, the PON cannot identify an output port of the splitter connected to the ONTs. In a conventional technology, to determine the topology connection relationship of the ODN network, an additional assembly needs to be added to the ONT or a receive optical path of the ONT needs to be changed. However, this is incompatible with existing ONTs.

SUMMARY

This application provides an optical distribution network, an optical network system, a splitter, and a method for identifying a port of the splitter, to identify a port of a splitter connected to an ONT while compatibility of an existing ONT is supported.

According to a first aspect, this application provides an optical distribution network. The optical distribution network may include N levels of splitters, M first optical filters, and K first power change assemblies, where N, M, and K are all positive integers. Each of the N levels of splitters includes at least one splitter, each of the at least one splitter may include at least two output ports, each of the at least two output ports corresponds to at least one first optical filter, different output ports correspond to different first optical filters, and center wavelengths of detection light that the different first optical filters allow to pass through or do not allow to pass through are different. Each output port of each splitter in an $N^{th}$-level splitter further corresponds to a first power change assembly, the first power change assembly is configured to change a power of first service light from an optical line terminal based on received first detection light, and the $N^{th}$-level splitter is one of the N levels of splitters that is configured to connect to an optical network terminal, where N is a positive integer.

Based on this solution, the center wavelengths of the detection light that different first optical filters allow to pass through or do not allow to pass through are different. When both the detection light and the first service light are transmitted to the first power change assembly, the first power change assembly may change the power of the first service light. When only the first service light is transmitted to the first power change assembly, the first power change assembly does not change the power of the first service light, so that a center wavelength of corresponding detection light can be determined based on a first power of the first service light and a second power of power-changed first service light, a corresponding first optical filter can be determined based on the center wavelength of the detection light, and a port of a splitter connected to the optical network terminal can be further determined based on the determined first optical filter.

In a possible implementation, N is an integer greater than 1. To be specific, the optical distribution network includes two or more levels of splitters. A first optical filter corresponding to any output port of a $K^{th}$-level splitter is different from a first optical filter corresponding to any output port of an $H^{th}$-level splitter. The $K^{th}$-level splitter and the $H^{th}$-level splitter are any two of the N levels of splitters, where both H and K are positive integers.

Based on this solution, output ports of different levels of splitters correspond to different first optical filters, and therefore which level of splitter in the N levels of splitters is connected to the optical network terminal may be determined.

In a possible implementation, N is an integer greater than 1. To be specific, the optical distribution network includes two or more levels of splitters. An output port of each splitter in an $L^{th}$-level splitter corresponds to a second power change assembly, and the $L^{th}$-level splitter is a splitter other than the $N^{th}$-level splitter in the N levels of splitters, where L is a positive integer. The second power change assembly is configured to change the power of the first service light from the optical line terminal based on received second detection light.

Further, optionally, a first optical filter corresponding to the output port of the $L^{th}$-level splitter is the same as a first optical filter corresponding to the output port of the $N^{th}$-level splitter.

Based on this solution, when output ports of different levels of splitters correspond to a same first optical filter, the output port of the splitter connected to the optical network terminal may be distinguished based on different powers generated on the first service light by the second power change assembly corresponding to the splitter. This helps save wavelength resources, to reduce specifications of splitters (where in other words, specifications of different levels of splitters are the same).

The following shows an example of possible implementations of connecting an output port, a power change assembly corresponding to the output port, and a first optical filter corresponding to the output port. An $i^{th}$ output port is used as an example. The $i^{th}$ output port is any one of at least two output ports of any splitter in the N levels of splitters, and i is a positive integer.

Implementation 1: The $i^{th}$ output port, a first optical filter corresponding to the $i^{th}$ output port, and a first power change assembly corresponding to the $i^{th}$ output port or a second power change assembly corresponding to the $i^{th}$ output port are sequentially integrated together.

This simplifies a manufacturing process of the optical distribution network by integrating the splitter, the first optical filter, and the gain assembly together.

Implementation 2: A first optical filter corresponding to the $i^{th}$ output port is integrated into the $i^{th}$ output port, and a first power change assembly corresponding to the $i^{th}$ output port or a second power change assembly corresponding to the $i^{th}$ output port is connected in series to the integrated first optical filter corresponding to the $i^{th}$ output port.

Implementation 3: A first optical filter corresponding to the $i^{th}$ output port is connected in series to the $i^{th}$ output port, and a first power change assembly corresponding to the $i^{th}$ output port or a second power change assembly corresponding to the $i^{th}$ output port is connected in series to the first optical filter corresponding to the $i^{th}$ output port.

In a possible implementation, the first power change assembly is a first gain assembly, and the second power change assembly is a second gain assembly; or the first power change assembly is a first attenuation assembly, and the second power change assembly is a second attenuation assembly.

In a possible implementation, the first power change assembly further corresponds to a second optical filter. The second optical filter is configured to reflect, back to the first power change assembly, the first detection light from the first power change assembly.

Based on this solution, the power of the first service light is changed at least twice in the first power change assembly. In this way, a difference between power variations of the first service light when the first service light is output from different output ports is increased, thereby helping improve accuracy of the identified port.

It may also be understood as that one end of the first power change assembly is connected to the first optical filter, and the other end of the first power change assembly is connected to the second optical filter.

According to a second aspect, this application provides an optical network system. The optical network system may include an optical network terminal and the optical distribution network in any one of the first aspect or the possible implementations of the first aspect. The optical network terminal is configured to determine a first power of first service light from the optical distribution network and a second power of power-changed first service light, where the first power and the second power are used to determine an output port of a splitter connected to the optical network terminal.

In a possible implementation, the optical network system further includes an optical line terminal. The optical line terminal is configured to: receive the first power and the second power from the optical network terminal; determine a power variation based on the first power and the second power; determine, based on the power variation and a center wavelength of first detection light, a center wavelength of detection light that a first optical filter allows to pass through or does not allow to pass through; and determine, based on the center wavelength of the detection light that the first optical filter allows to pass through or does not allow to pass through and a correspondence between a center wavelength and an output port of a splitter, the output port of the splitter connected to the optical network terminal.

In a possible implementation, the optical network terminal is further configured to: determine a power variation based on the first power and the second power; determine, based on the power variation and a center wavelength of first detection light, a center wavelength of detection light that a first optical filter allows to pass through or does not allow to pass through; and determine, based on the center wavelength of the detection light that the first optical filter allows to pass through or does not allow to pass through and a correspondence between a center wavelength and an output port of a splitter, the output port of the splitter connected to the optical network terminal.

In a possible implementation, a detection light source may be a wavelength-tunable light source, and/or a combination of an optical switch and a light source emitting at least one fixed wavelength. The optical switch is configured to control one of the light sources emitting at least one fixed wavelength to output detection light, and a center wavelength of the detection light output by the light source corresponds to a center wavelength that a first optical filter allows to pass through or does not allow to pass through.

In a possible implementation, N is an integer greater than 1, to be specific, the optical distribution network includes two or more levels of splitters. A first optical filter corresponding to any output port of a $K^{th}$-level splitter is different from a first optical filter corresponding to any output port of an $H^{th}$-level splitter. The $K^{th}$-level splitter and the $H^{th}$-level splitter are any two of the N levels of splitters, where both H and K are positive integers.

Based on this solution, output ports of different levels of splitters correspond to different first optical filters, and therefore which level of splitter in the N levels of splitters is connected to the optical network terminal may be determined.

In a possible implementation, N is an integer greater than 1, to be specific, the optical distribution network includes two or more levels of splitters. An output port of each splitter in an $L^{th}$-level splitter corresponds to a second power change assembly, and the $L^{th}$-level splitter is a splitter other than the $N^{th}$-level splitter in the N levels of splitters, where L is a positive integer. The second power change assembly is configured to change the power of the first service light from the optical line terminal based on received second detection light.

Further, optionally, a first optical filter corresponding to the output port of the $L^{th}$-level splitter is the same as a first optical filter corresponding to the output port of the $N^{th}$-level splitter.

Based on this solution, when output ports of different levels of splitters correspond to a same first optical filter, an output port of a splitter connected to the optical network terminal may be distinguished based on different powers generated on the first service light by the second power change assembly corresponding to the splitter.

The following shows an example of possible implementations of connecting an output port, a power change assembly corresponding to the output port, and a first optical filter corresponding to the output port. An $i^{th}$ output port is used as an example. The $i^{th}$ output port is any one of at least two output ports of any splitter in the N levels of splitters, and i is a positive integer.

Implementation 1: The $i^{th}$ output port, a first optical filter corresponding to the $i^{th}$ output port, and a first power change assembly corresponding to the $i^{th}$ output port or a second power change assembly corresponding to the $i^{th}$ output port are sequentially integrated together.

This simplifies a manufacturing process of the optical distribution network by integrating the splitter, the first optical filter, and the gain assembly together.

Implementation 2: A first optical filter corresponding to the $i^{th}$ output port is integrated into the $i^{th}$ output port, and a first power change assembly corresponding to the $i^{th}$ output port or a second power change assembly corresponding to the $i^{th}$ output port is connected in series to the integrated first optical filter corresponding to the $i^{th}$ output port.

Implementation 3: A first optical filter corresponding to the $i^{th}$ output port is connected in series to the $i^{th}$ output port, and a first power change assembly corresponding to the $i^{th}$ output port or a second power change assembly corresponding to the $i^{th}$ output port is connected in series to the first optical filter corresponding to the $i^{th}$ output port.

In a possible implementation, the first power change assembly is a first gain assembly, and the second power change assembly is a second gain assembly; or the first power change assembly is a first attenuation assembly, and the second power change assembly is a second attenuation assembly.

In a possible implementation, the first power change assembly further corresponds to a second optical filter. The second optical filter is configured to reflect, back to the first power change assembly, the first detection light from the first power change assembly.

Based on this solution, the power of the first service light is changed at least twice in the first power change assembly. In this way, a difference between power variations of the first service light when the first service light is output from different output ports is increased, thereby helping improve accuracy of the identified port.

It may also be understood as that one end of the first power change assembly is connected to the first optical filter, and the other end of the first power change assembly is connected to the second optical filter.

According to a third aspect, this application provides a splitter. The splitter may include at least two output ports and at least one first optical filter corresponding to each of the at least two output ports. Different output ports correspond to different first optical filters, and center wavelengths of detection light that the different first optical filters allow to pass through or do not allow to pass through are different.

Further, optionally, the splitter includes a power change assembly, where the power change assembly is configured to change a power of first service light from an optical line terminal based on received first detection light.

In a possible implementation, the power change assembly is a gain assembly or an attenuation assembly.

According to a fourth aspect, this application provides a method for identifying a port of a splitter, where the method is applied to an optical network system. The optical network system includes an optical distribution network and an optical network terminal. The optical distribution network includes N levels of splitters, M first optical filters, and K first power change assemblies, where N, M, and K are all positive integers. Each of the N levels of splitters includes at least one splitter, each of the at least one splitter includes at least two output ports, each of the at least two output ports corresponds to at least one first optical filter, different output ports correspond to different first optical filters, and center wavelengths of detection light that the different first optical filters allow to pass through or do not allow to pass through are different. Each output port of each splitter in an $N^{th}$-level splitter further corresponds to a first power change assembly, and the $N^{th}$-level splitter is one of the N levels of splitters that is configured to connect to the optical network terminal. The method includes: receiving first service light, and determining a first power of the first service light; and receiving power-changed first service light, and determining a second power of the power-changed first service light, where the power-changed first service light is obtained by changing the power of the first service light based on received first detection light by the first power change assembly. The first power and the second power are used to determine an output port of a splitter connected to the optical network terminal.

In a possible implementation, the optical network terminal may determine a power variation based on the second power and the first power; determine, based on the power variation and a center wavelength of the first detection light, a center wavelength of detection light that the first optical filter allows to pass through or does not allow to pass through; and determine, based on the center wavelength of the detection light that the first optical filter allows to pass through or does not allow to pass through and a correspondence between a center wavelength and an output port of a splitter, the output port of the splitter connected to the optical network terminal.

In another possible implementation, the optical network system may further include an optical line terminal. The optical line terminal receives the first power and the second power from the optical network terminal; determine a power variation based on the first power and the second power; determine, based on the power variation and a center wavelength of the first detection light, a center wavelength of detection light that the first optical filter allows to pass through or does not allow to pass through; and determine, based on the center wavelength of the detection light that the first optical filter allows to pass through or does not allow to pass through and a correspondence between a center wavelength and an output port of a splitter, the output port of the splitter connected to the optical network terminal.

According to a fifth aspect, this application provides a method for identifying a port of a splitter. The method includes: An optical network terminal receives first service light from an optical line terminal, and determines a first power of the first service light; and the optical network terminal receives power-changed first service light from a first power change assembly, and determines a second power of the power-changed first service light, where the power-changed first service light is obtained by changing the power of the first service light based on received first detection light by the first power change assembly. A center wavelength of the first detection light is a center wavelength that a first optical filter corresponding to the first power change assembly allows to pass through, and center wavelengths of detection light that different first optical filters allow to pass through or do not allow to pass through are different. The first power and the second power are used to determine an output port of a splitter connected to the optical network terminal.

In a possible implementation, the optical network terminal determines a power variation based on the second power and the first power; the optical network terminal determines, based on the power variation and the center wavelength of the first detection light, a center wavelength of detection light that the first optical filter allows to pass through or does not allow to pass through; and the optical network terminal determines, based on the center wavelength of the detection light that the first optical filter allows to pass through or does not allow to pass through and a correspondence between a center wavelength and an output port of a splitter, the output port of the splitter connected to the optical network terminal.

In another possible implementation, the optical line terminal receives the first power and the second power from the optical network terminal; the optical line terminal determines a power variation based on the first power and the second power; the optical line terminal determines, based on the power variation and the center wavelength of the first detection light, a center wavelength of detection light that the first optical filter allows to pass through or does not allow to pass through; and the optical line terminal determines, based on the center wavelength of the detection light that the first optical filter allows to pass through or does not allow to pass through and a correspondence between a center wavelength and an output port of a splitter, the output port of the splitter connected to the optical network terminal.

According to a sixth aspect, this application provides a computer-readable storage medium. The computer-readable storage medium stores a computer program or instructions. When the computer program or the instructions are executed by an optical network terminal or an optical line terminal, the optical network terminal or the optical line terminal is enabled to perform the method in any one of the fourth aspect or the possible implementations of the fourth aspect.

According to a seventh aspect, this application provides a computer program product. The computer program product includes a computer program or instructions. When the computer program or the instructions are executed by an optical network terminal or an optical line terminal, the optical network terminal or the optical line terminal is enabled to perform the method in any one of the first aspect or the possible implementations of the first aspect.

For technical effects that can be achieved in any one of the second aspect to the seventh aspect, refer to descriptions of advantageous effects in the first aspect. Details are not described herein again.

DETAILED DESCRIPTION OF ILLUSTRATIVE EMBODIMENTS

Figure 1:
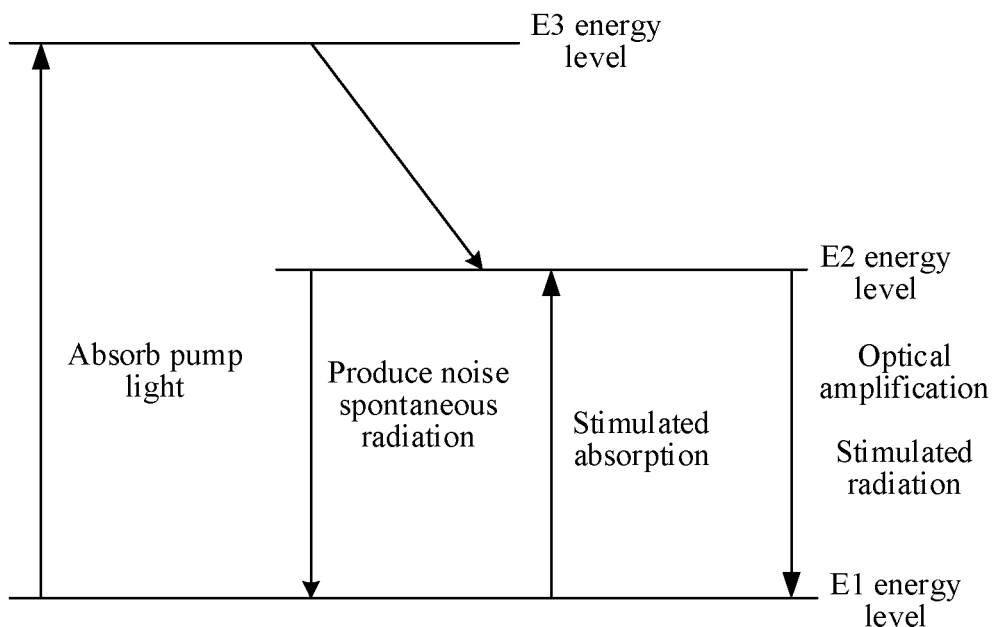
FIG. 1 is a simplified schematic diagram of energy levels of an erbium ion according to this application.

The following describes in detail embodiments of this application with reference to the accompanying drawings.

The following describes some terms in this application. It is to be noted that these explanations are intended to facilitate understanding by a person skilled in the art, but do not constitute any limitation on the protection scope claimed in this application.

1. Stimulated Brillouin Scattering (SBS) Effect

The SBS effect is a Raman effect. Due to interaction between photons and molecules, a silicon dioxide lattice of a fiber generates light scattering when incident light is excessively strong, to form a frequency-shift scattering wave. A part of energy of the incident light is transferred to backscattering light. Consequently, the incident light is dissipated over the fiber. The effect is generated because an incident power is very high, an electromagnetic telescopic effect generated by a light wave stimulates an ultrasonic wave in a material, and the incident light is scattered by the influence of the ultrasonic wave.

2. First Optical Filter

The first optical filter is an apparatus used for wavelength selection. The first optical filter may select or filter a required wavelength from a plurality of wavelengths.

3. Splitter

The splitter is a passive component, may also be referred to as an optical splitter, and may be a junction component having a plurality of input ends and a plurality of output ends. Usually, when performing optical splitting for a normal link, the splitter performs optical splitting allocation, based on ratios corresponding to powers, to a plurality of links with optical splitting performed. It should be understood that there is some attenuation on the power of the link on which optical splitting has been performed.

4. Optical Switch

The optical switch is an optical path conversion component, and is an optical component having one or more optional transmission ports. A function of the optical switch is to perform physical switching or a logical operation on an optical signal in an optical transmission line or an integrated optical path. The optical switch may be a conventional mechanical optical switch, a micromechanical optical switch, a thermal optical switch, a liquid crystal optical switch, an electro-optic switch, an acoustic-optic switch, or the like. The mechanical optical switch may directly couple light to an output end by moving a fiber, or directly send or reflect the light to the output end by switching an optical path using a prism or a reflector.

5. Doped Fiber

The doped fiber is a fiber that is doped with a specific element, for example, a rare-earth doped fiber. The rare-earth doped fiber is an optical fiber into which ions of a rare-earth element have been incorporated into a silica fiber. The rare-earth doped fiber may be configured to amplify received signal light of various wavelengths. Specifically, a gain corresponding to a signal light of each wavelength may be obtained through design based on an intrinsic parameter of the rare-earth doped fiber. The doped rare earth may be an erbium ion, a thulium ion, a neodymium ion, an erbium ion and an ytterbium ion, or the like. This is not limited in this application.

It is to be noted that, gains generated for the input signal light vary with concentrations of the doped elements, and gains generated for the input signal light also vary with types of the doped elements. That is, a gain of the doped fiber is related to parameters such as the type and concentration of the doped element.

6. Wavelength Division Multiplexing (WDM)

Wavelength division multiplexing is a technology that combines optical signals (carrying various information) of two or more different wavelengths at a transmitting end by using a multiplexer (which is also referred to as a combiner (combiner)) and couples the combined signals to a same fiber of an optical line for transmission. At a receiving end, optical signals with various wavelengths are separated by using a demultiplexer (which is also referred to as a beam splitter or a demultiplexer) and then further processed by an optical receiver to restore the original signals. This technology of transmitting optical signals of two or more different wavelengths over a same fiber is referred to as wavelength division multiplexing. A wavelength division multiplexer transmits the optical signals based on the wavelength division multiplexing technology.

7. Planar Lightwave Circuit (PLC)

In the planar lightwave circuit, a lightwave circuit is located in a plane.

The foregoing describes some terms in this application, and the following describes technical features in this application. It is to be noted that these explanations are intended to facilitate understanding by a person skilled in the art, but do not constitute any limitation on the protection scope claimed in this application.

An erbium-doped fiber (EDF) is used as an example to describe a principle of amplifying signal light by the EDF (or referred to as generating a gain for the signal light).

The principle of amplifying the signal light by the EDF is to convert energy of detection light (namely, pump light) into energy of the signal light. An erbium ion has three energy levels: an E1 energy level, an E2 energy level, and an E3 energy level. FIG. 1 is a simplified schematic diagram of energy levels of an erbium ion. An E1 energy level represents a ground state, with a lowest energy and a largest quantity of particles. An E2 energy level is a metastable state, which is an intermediate energy level, is more active than the ground state and more stable than an excited state. A quantity of particles in the metastable state is relatively stable and can be kept in a stable state for a period of time. An E3 energy level represents the excited state, with a highest energy.

When a detection light source is added, and photon energy of the detection light is equal to an energy difference between the E3/E2 energy level and the E1 energy level, the erbium ion absorbs the detection light and jumps from the ground state to the excited state, in other words, the E1 energy level jumps to the E3/E2 energy level after the energy of the detection light is absorbed. In this case, an EDF is in a population inversion state. Because the excited state is unstable, the erbium ion returns to the E2 energy level quickly. If energy of input signal light is equal to an energy difference between the E2 energy level and the E1 energy level, the erbium ion at the E2 energy level jumps to the ground state, generates stimulated radiation light, and may amplify the signal light.

Figure 2:
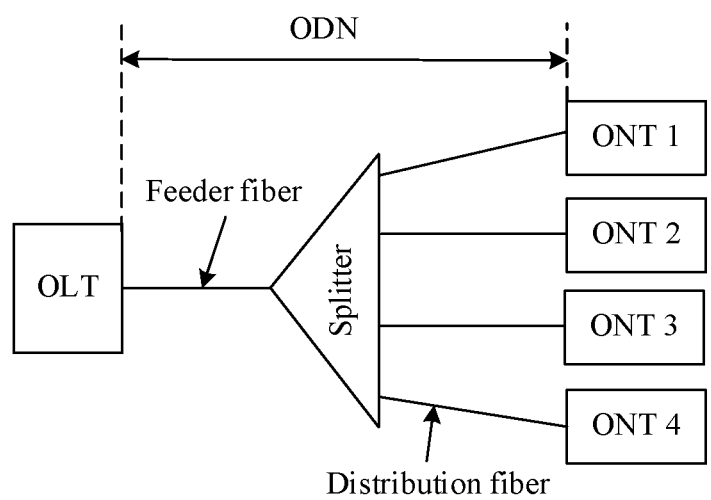
FIG. 2 is a schematic diagram of an architecture of a PON system according to this application.

Based on the foregoing content, FIG. 2 is a schematic diagram of an architecture of a PON system. An example in which the PON system is a PON system based on a tree network topology structure is used. The PON system may include an OLT, an ODN, and ONTs. The OLT is connected to each of four ONTs via the ODN. In FIG. 2, an example in which four ONTs are respectively an ONT 1, an ONT 2, an ONT 3, and an ONT 4 is used. The ODN includes a feeder fiber, a splitter (splitter), and distribution fibers. In FIG. 2, for example, one level of splitter is included, and the level of splitter is a 1×4 splitter. The OLT is connected to the splitter via the feeder fiber, and the splitter is connected to each ONT via the distribution fibers.

It should be understood that quantities of OLTs, ONTs, splitters, and ports in the PON system, and a quantity of ports included in the splitters all are not limited in this application. FIG. 2 is merely a schematic diagram.

It is to be noted that a transmission direction in which an optical signal is transmitted from an OLT to an ONT is referred to as a downstream direction. A direction in which an optical signal is transmitted from the ONT to the OLT is referred to as an upstream direction. The OLT may transmit the optical signal to the ONT in a broadcast mode, and the ONT may transmit the optical signal to the OLT in a unicast mode. It should be understood that, in the upstream direction, the PON system is a multi-point to point (multi-point to point, MP2P) system; in the downstream direction, the PON system is a point to multi-point (point to multi-point, P2MP) system.

Based on the PON system shown in FIG. 2, in a conventional technology, to identify an output port of the splitter connected to the ONTs, a structure of the ONTs needs to be changed. For example, a three-directional optical subassembly is additionally added to the ONTs, and the output port of the splitter connected to the ONTs is determined by determining a power of an optical signal received by the three-directional optical subassembly. In other words, in the conventional technology, when the port of the splitter connected to the ONTs is determined, the structure of the existing ONTs needs to be changed. In other words, compatibility of the existing ONTs is not supported.

In view of the foregoing problem, this application provides an optical distribution network, an optical network system, a splitter, and a method for identifying a port of the splitter. An output port of a splitter connected to an optical network terminal can be identified while compatibility of an existing optical network terminal is supported. The following describes in detail the optical distribution network, the optical network system, the splitter, and the method for identifying the port of the splitter that are provided in this application.

Figure 3:
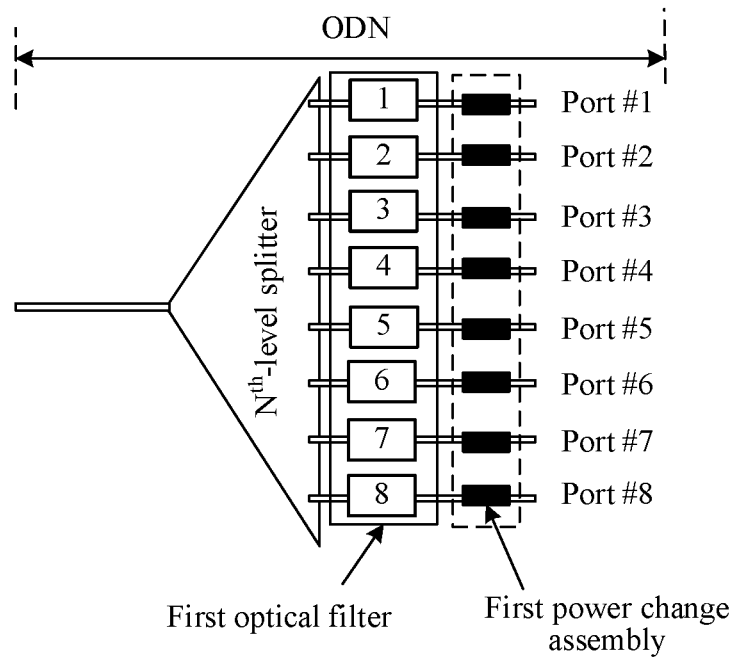
FIG. 3 is a schematic diagram of an architecture of an optical distribution network according to this application.

FIG. 3 is a schematic diagram of an architecture of an optical distribution network according to this application. The optical distribution network includes N levels of splitters, M first optical filters, and K first power change assemblies, where N, M, and K are all positive integers. Each of the N levels of splitters includes at least one splitter, each of the at least one splitter includes at least two output ports, each of the at least two output ports corresponds to at least one first optical filter, different output ports correspond to different first optical filters, and center wavelengths of detection light that the different first optical filters allow to pass through or do not allow to pass through are different. Each output port of each splitter in an $N^{th}$-level splitter further corresponds to a first power change assembly, the first power change assembly is configured to change a power of first service light from an optical line terminal based on received first detection light, and the $N^{th}$-level splitter is one of the N levels of splitters that is configured to connect to an optical network terminal, where N is a positive integer.

In FIG. 3, an $N^{th}$-level splitter is used as an example. For example, the $N^{th}$-level splitter includes one splitter, the splitter includes eight output ports, where a port #1 to a port #8 are used to identify the eight different output ports, and each output port corresponds to one first optical filter. The port #1 corresponds to a first optical filter 1 and corresponds to a power change assembly 1, the port #2 corresponds to a first optical filter 2 and corresponds to a power change assembly 2, . . . , and the port #8 corresponds to a first optical filter 8 and corresponds to a power change assembly 8. Center wavelengths of detection light that the first optical filter 1 to the first optical filter 8 allow to pass through or do not allow to pass through are different, and the power change assembly 1 to the power change assembly 8 are collectively referred to as a first power change assembly.

It should be understood that the optical distribution network shown in FIG. 3 is merely an example. The optical distribution network in this application may have more or fewer splitters than the optical distribution network shown in FIG. 3, or may have more or fewer output ports than the splitter shown in FIG. 3.

Based on this solution, center wavelengths of detection light that different first optical filters allow to pass through or do not allow to pass through are different. When both the detection light and the first service light are transmitted to the first power change assembly, the first power change assembly may change the power of the first service light. When only the first service light is transmitted to the first power change assembly, the first power change assembly does not change the power of the first service light, so that a center wavelength of corresponding detection light can be determined based on a first power of the first service light and a second power of power-changed first service light, a corresponding first optical filter can be determined based on the center wavelength of the detection light, and a port of a splitter connected to the optical network terminal can be further determined based on the determined first optical filter.

In a possible implementation, the first service light includes but is not limited to downstream signal light of a gigabit-capable passive optical network (gigabit-capable passive optical network, GPON) or an Xgigabit-capable passive optical network (Xgigabit-capable passive optical network, XGPON), for example, a 10 GPON or a 20 GPON, where a wavelength of the GPON is about 1490±10 nm, and a wavelength of the XGPON is about 1575 nm to 1581 nm.

In a possible implementation, center wavelengths of different detection light are different, and a center wavelength of the first detection light may enable a particle in the first power change assembly to jump from a ground state to an excited state. With reference to FIG. 1, if the first power change assembly is an EDF, the center wavelength of the first detection light may pass through a corresponding first optical filter, and an erbium ion may be enabled to jump from the ground state (an E1 energy level) to the excited state (for example, the E2 energy level or a higher energy level). For the center wavelength of the detection light, refer to the following related descriptions of a detection light source.

The following describes each functional structure shown in FIG. 3, to provide an example of a specific implementation solution.

1. Optical Filter

In a possible implementation, the first optical filter may be a band-stop filter (BSF). The band-stop filter is a filter that attenuates a wave at a specific frequency band to an extremely low level and allows light at a frequency band other than the specific frequency band to pass through. In other words, the band-stop filter does not allow light at the specific frequency band to pass through and allows the light at the frequency band other than the specific frequency band to pass through. A wavelength corresponding to the specific frequency band is a center wavelength of the light that the band-stop filter does not allow to pass through. In other words, the band-stop filter does not allow light of a specific wavelength (namely, the center wavelength) to pass through.

In another possible implementation, the first optical filter may alternatively be a band-pass filter (BPF). The band-pass filter is a filter that allows light at a specific frequency band to pass through and blocks (or attenuates to an extremely low level) light at another frequency band. A wavelength corresponding to the specific frequency band is a center wavelength of light that the band-pass filter allows to pass through. In other words, the band-pass filter allows light of a specific wavelength (namely, the center wavelength) to pass through. It should be understood that the band-stop filter is relative to the band-pass filter.

For example, the first optical filter may be a fiber filter. The fiber filter is a component that uses a special fiber structure to select or filter a wave of the center wavelength (namely, the specific wavelength) from waves of different wavelengths. In other words, the fiber filter may be a band-stop filter, or may be a band-pass filter. The fiber filter may be, for example, a fiber Bragg grating (FBG) or a long-period fiber grating (LPG).

For ease of solution description, a center wavelength of light that the first optical filter allows to pass through or does not allow to pass through is referred to as a center wavelength corresponding to the first optical filter in the following. It may also be understood as that the center wavelength corresponding to the first optical filter is the center wavelength of the light that the first optical filter allows to pass through or does not allow to pass through. In other words, the center wavelength corresponding to the first optical filter in the following may be replaced with the center wavelength of the light that the first optical filter allows to pass through, or may be replaced with the center wavelength of the light that the first optical filter does not allow to pass through.

In this application, different first optical filters correspond to different center wavelengths. For example, the first optical filter 1 corresponds to a center wavelength $\lambda 1$, the first optical filter 2 corresponds to a center wavelength $\lambda 2$, and the first optical filter 3 corresponds to a center wavelength $\lambda 3$. The center wavelength $\lambda 1$, the center wavelength $\lambda 2$, and the center wavelength $\lambda 3$ are different from each other. That the first optical filter 1 corresponds to the center wavelength $\lambda 1$ means that the first optical filter 1 allows light of the center wavelength $\lambda 1$ to pass through, that the first optical filter 2 corresponds to the center wavelength $\lambda 2$ means that the first optical filter 2 allows light of the center wavelength $\lambda 2$ to pass through, and that the first optical filter 3 corresponds to the center wavelength $\lambda 3$ means that the first optical filter 3 allows light of the center wavelength $\lambda 3$ to pass through. Alternatively, that the first optical filter 1 corresponds to the center wavelength $\lambda 1$ means that the first optical filter 1 does not allow light of the center wavelength $\lambda 1$ to pass through, that the first optical filter 2 corresponds to the center wavelength $\lambda 2$ means that the first optical filter 2 does not allow light of the center wavelength $\lambda 2$ to pass through, and that the first optical filter 3 corresponds to the center wavelength $\lambda 3$ means that the first optical filter 3 does not allow light of the center wavelength $\lambda 3$ to pass through.

In a possible implementation, a second optical filter is a reflective optical filter. The second optical filter may reflect light on a full band. Further, optionally, the second optical filter may reflect detection light of all center wavelengths emitted by the detection light source. For example, if center wavelengths of detection light emitted by the detection light source are respectively the center wavelength $\lambda 1$ to a center wavelength $\lambda 8$, the second optical filter may reflect all detection light of the center wavelength $\lambda 1$ to the center wavelength $\lambda 8$. It should be understood that different first power change assemblies may correspond to a same second optical filter.

2. Splitter

In a possible implementation, there are mainly two types of splitters: a fused biconical taper type and a planar lightwave circuit PLC type. Usually, a 1×2 splitter and a 1×4 splitter uses the fused biconical taper type. A 1×8 or higher splitter uses the PLC type. The PLC type splitter uses a semiconductor processing technology, which ensures good optical splitting consistency and good channel evenness. The 1×2 splitter indicates that the splitter includes one input port and two output ports, the 1×4 splitter indicates that the splitter includes one input port and four output ports, and the 1×8 splitter indicates that the splitter includes one input port and eight output ports.

Figure 4:
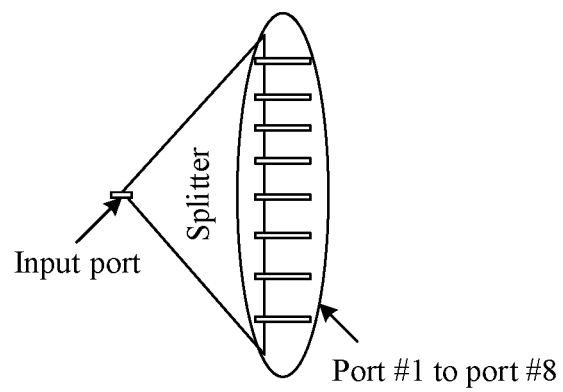
FIG. 4 is a schematic diagram of a structure of a splitter according to this application.

FIG. 4 is a schematic diagram of a structure of a splitter according to this application. That the splitter is a 1×8 splitter is used as an example for description. To be specific, the splitter includes one input port and eight output ports. Signal light (for example, first service light) is input into the splitter from the input port, and may be divided into eight pails, which are respectively output from the eight different output ports (that is, divided into eight links). It is to be noted that the signal light may be equally divided into eight parts based on powers, or may be divided into eight pails based on a power-fixed ratio. It should be understood that split ratios of the splitter may be equal or unequal. This is not limited in this application.

3. Power Change Assembly

In a possible implementation, the power change assembly may be a gain assembly, or may be an attenuation assembly. The gain assembly is an assembly that generates a gain for transmitted signal light, and the attenuation assembly is an assembly that attenuates transmitted signal light.

For example, the power change assembly may be a doped fiber, for example, an EDF or a thulium-doped fiber (TDF), and a length may be, for example, about 40 cm. The power change assembly may alternatively be a doped glass block, for example, an erbium-doped glass block or a thulium-doped glass block. It is to be noted that the power change assembly may alternatively be a fiber or a glass block doped with another element, and the foregoing rare earth is merely used as an example.

In this application, different power change assemblies generate different power variations for the first service light. Each output port of each splitter in the $N^{th}$-level splitter corresponds to the first power change assembly, and different output ports may correspond to a same first power change assembly or different first power change assemblies.

In the following descriptions, for ease of solution description, an example in which the power change assembly is a gain assembly is used.

In a possible implementation, a first gain assembly generates a gain for the first service light based on the received first detection light. In other words, when both the first detection light and the first service light are transmitted to the gain assembly, the gain assembly may amplify the first service light. When only the first service light is transmitted to the gain assembly, the gain assembly does not generate a gain for the first service light, and may transmit the first service light to an output port of a next level of splitter or an optical network terminal.

The following describes a correspondence between an output port of a splitter, a first optical filter, and a gain assembly by using different cases.

Case 1: One output port of the splitter corresponds to one first optical filter, and different output ports correspond to different first optical filters.

Figure 5A:
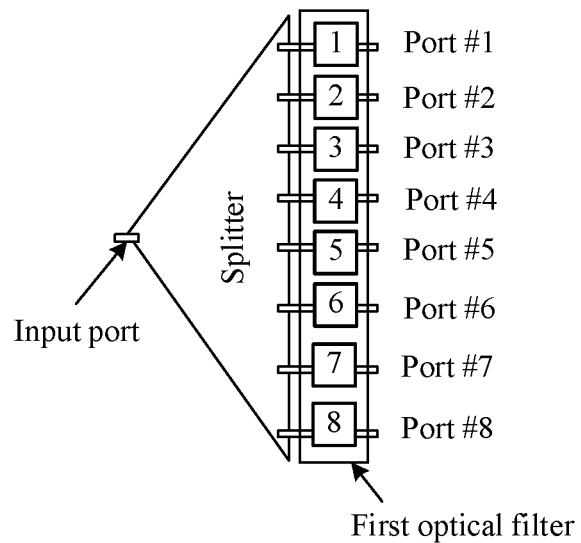
FIG. 5a is a schematic diagram of a correspondence between an output port of a splitter and a first optical filter according to this application.

It may also be understood as that a plurality of output ports of the splitter are in one-to-one correspondence with a plurality of first optical filters. In other words, a center wavelength corresponding to one first optical filter may identify one output port of the splitter. FIG. 5a is a schematic diagram of a correspondence between an output port of a splitter and a first optical filter according to this application. A 1×8 splitter is used as an example. The splitter includes eight output ports: an output port 1 (a port #1), an output port 2 (a port #2), an output port 3 (a port #3), an output port 4 (a port #4), an output port 5 (a port #5), an output port 6 (a port #6), an output port 7 (a port #7), and an output port 8 (a port #8). The output port 1 corresponds to a first optical filter 1, the output port 2 corresponds to a first optical filter 2, the output port 3 corresponds to a first optical filter 3, the output port 4 corresponds to a first optical filter 4, the output port 5 corresponds to a first optical filter 5, the output port 6 corresponds to a first optical filter 6, the output port 7 corresponds to a first optical filter 7, and the output port 8 corresponds to a first optical filter 8. A center wavelength corresponding to the first optical filter 1 is $\lambda 1$, a center wavelength corresponding to the first optical filter 2 is $\lambda 2$, a center wavelength corresponding to the first optical filter 3 is $\lambda 3$, a center wavelength corresponding to the first optical filter 4 is $\lambda 4$, a center wavelength corresponding to the first optical filter 5 is $\lambda 5$, a center wavelength corresponding to the first optical filter 6 is $\lambda 6$, a center wavelength corresponding to the first optical filter 7 is $\lambda 7$, and a center wavelength corresponding to the first optical filter 8 is $\lambda 8$. The center wavelength $\lambda 1$, the center wavelength $\lambda 2$, the center wavelength $\lambda 3$, the center wavelength $\lambda 4$, the center wavelength $\lambda 5$, the center wavelength $\lambda 6$, the center wavelength $\lambda 7$, and the center wavelength $\lambda 8$ are different from each other.

Case 2: Some output ports of the splitter correspond to one first optical filter, and some output ports correspond to a plurality of filters.

Figure 5B:
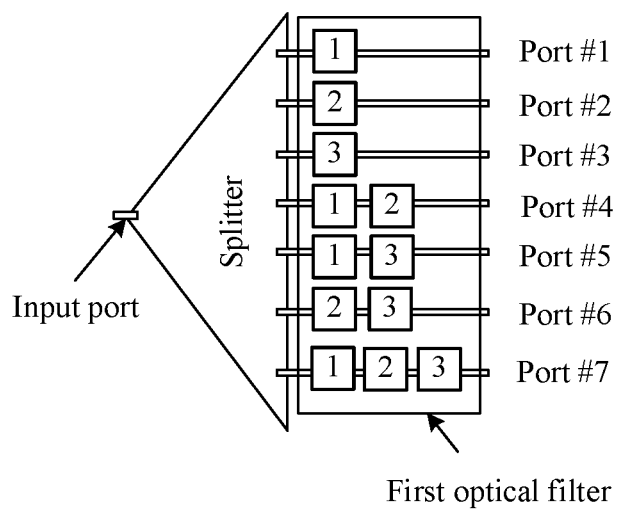
FIG. 5b is a schematic diagram of another correspondence between an output port of a splitter and a first optical filter according to this application.

It may also be understood as that, some output ports of the splitter may be identified by using a center wavelength corresponding to one first optical filter, and some output ports may be identified by using center wavelengths respectively corresponding to a plurality of first optical filters. In other words, a combination code of the center wavelengths respectively corresponding to the plurality of first optical filters may identify output ports of one splitter. FIG. 5b is a schematic diagram of another correspondence between an output port of a splitter and a first optical filter according to this application. A 1×7 splitter is used as an example. The splitter includes an output port 1 (a port #1), an output port 2 (a port #2), an output port 3 (a port #3), an output port 4 (a port #4), an output port 5 (a port #5), an output port 6 (a port #6), and an output port 7 (a port #7). The output port 1 corresponds to a first optical filter 1, the output port 2 corresponds to a first optical filter 2, the output port 3 corresponds to a first optical filter 3, the output port 4 corresponds to the first optical filter 1 and the first optical filter 2, the output port 5 corresponds to the first optical filter 1 and the first optical filter 3, the output port 6 corresponds to the first optical filter 2 and the first optical filter 3, and the output port 7 corresponds to the first optical filter 1, the first optical filter 2, and the first optical filter 3. A center wavelength corresponding to the first optical filter 1 is $\lambda 1$, a center wavelength corresponding to the first optical filter 2 is $\lambda 2$, and a center wavelength corresponding to the first optical filter 3 is $\lambda 3$. The center wavelength $\lambda 1$, the center wavelength $\lambda 2$, and the center wavelength $\lambda 3$ are different from each other. In other words, the output port 1 may be identified by using the center wavelength $\lambda 1$ corresponding to the first optical filter 1, the output port 2 may be identified by using the center wavelength $\lambda 2$ corresponding to the first optical filter 2, the output port 3 may be identified by using the center wavelength $\lambda 3$ corresponding to the first optical filter 3, the output port 4 may be identified by using a combination of the center wavelength $\lambda 1$ corresponding to the first optical filter 1 and the center wavelength $\lambda 2$ corresponding to the first optical filter 2, the output port 5 may be identified by using a combination of the center wavelength $\lambda 1$ corresponding to the first optical filter 1 and the center wavelength $\lambda 3$ corresponding to the first optical filter 3, the output port 6 may be identified by using a combination of the center wavelength $\lambda 2$ corresponding to the first optical filter 2 and the center wavelength $\lambda 3$ corresponding to the first optical filter 3, and the output port 7 may be identified by using a combination of the center wavelength $\lambda 1$ corresponding to the first optical filter 1, the center wavelength $\lambda 2$ corresponding to the first optical filter 2, and the center wavelength $\lambda 3$ corresponding to the first optical filter 3.

Different output ports of the splitter are identified by using combinations of center wavelengths corresponding to a plurality of first optical filters. This helps reduce a quantity of required center wavelengths.

It is to be noted that a minimum quantity of required different first optical filters is determined based on a quantity of output ports of the splitter. For example, if the splitter includes eight output ports, at least three first optical filters corresponding to different center wavelengths are required for combination, to distinguish between the eight different output ports.

In this application, different output ports of a same level of splitter correspond to different first optical filters (which may be single first optical filters (as shown in FIG. 5a), or may correspond to combinations of a plurality of first optical filters (as shown in FIG. 5b)), and different first optical filters correspond to different center wavelengths. Output ports of different levels of splitters may correspond to different first optical filters. For example, a first optical filter corresponding to any output port of a $K^{th}$-level splitter is different from a first optical filter corresponding to any output port of an $H^{th}$-level splitter, where both H and K are positive integers. The $K^{th}$-level splitter and the $H^{th}$-level splitter are any two of N levels of splitters.

Alternatively, output ports of different levels of splitters may correspond to a same first optical filter. For example, a first optical filter corresponding to an output port of an $L^{th}$-level splitter is the same as a first optical filter corresponding to an output port of an $N^{th}$-level splitter, and the $L^{th}$-level splitter is a splitter other than the $N^{th}$-level splitter in N levels of splitters, where L is a positive integer. It is to be noted that the output port of the $L^{th}$-level splitter further corresponds to a second power change assembly, and the second power change assembly is configured to change a power of first service light from an optical line terminal based on received second detection light.

The following separately describes possible combination manners of different levels of splitters. For ease of solution description, N=2 is used as an example. Two levels of splitters are respectively referred to as a first-level splitter and a second-level splitter. It should be understood that there may be a plurality of second-level splitters. In the following descriptions, for ease of solution description, an example in which there is one second-level splitter is used.

Manner 1: A first optical filter corresponding to an output port of the first-level splitter is different from a first optical filter corresponding to an output port of the second-level splitter.

Figure 6A:
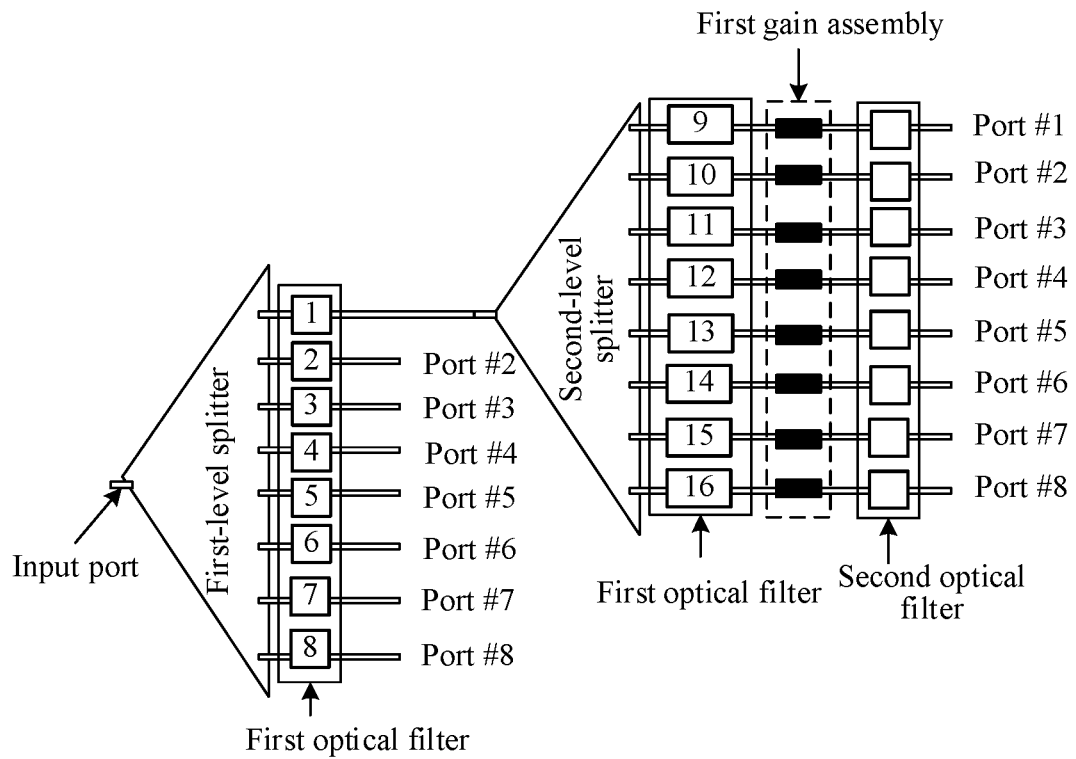
FIG. 6a is a schematic diagram of a correspondence between an output port of each of two levels of splitters and a first optical filter according to this application.

FIG. 6a is a schematic diagram of a correspondence between an output port of each of two levels of splitters and a first optical filter according to this application. Eight output ports of the first-level splitter correspond to eight different first optical filters, and eight output ports of the second-level splitter correspond to eight different first optical filters. The eight different first optical filters corresponding to the eight output ports of the first-level splitter correspond to eight center wavelengths: a center wavelength $\lambda 1$, a center wavelength $\lambda 2$, a center wavelength $\lambda 3$, a center wavelength $\lambda 4$, a center wavelength $\lambda 5$, a center wavelength $\lambda 6$, a center wavelength $\lambda 7$, and a center wavelength $\lambda 8$. The eight different first optical filters corresponding to the eight output ports of the second-level splitter correspond to eight center wavelengths: a center wavelength $\lambda 9$, a center wavelength $\lambda 10$, a center wavelength $\lambda 11$, a center wavelength $\lambda 12$, a center wavelength $\lambda 13$, a center wavelength $\lambda 14$, a center wavelength $\lambda 15$, and a center wavelength $\lambda 16$. The 16 center wavelengths from the center wavelength $\lambda 1$ to the center wavelength $\lambda 16$ are different from each other. For details, refer to Table 1.

TABLE 1

Correspondence between an output port of a splitter and a center wavelength

| Output port | First-level splitter | | | | | | | | Second-level splitter | | | | | | | |
|---|---|---|---|---|---|---|---|---|---|---|---|---|---|---|---|---|
| | #1 | #2 | #3 | #4 | #5 | #6 | #7 | #8 | #1 | #2 | #3 | #4 | #5 | #6 | #7 | #8 |
| Center wavelength | $\lambda 1$ | $\lambda 2$ | $\lambda 3$ | $\lambda 4$ | $\lambda 5$ | $\lambda 6$ | $\lambda 7$ | $\lambda 8$ | $\lambda 9$ | $\lambda 10$ | $\lambda 11$ | $\lambda 12$ | $\lambda 13$ | $\lambda 14$ | $\lambda 15$ | $\lambda 16$ |

Figure 6B:
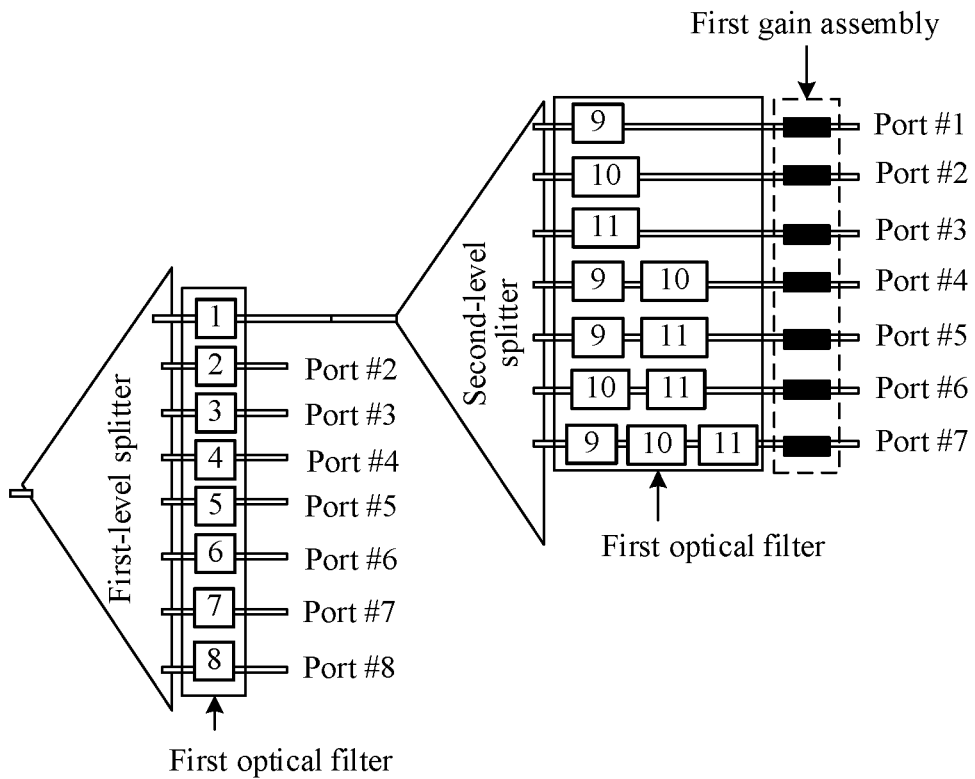
FIG. 6b is a schematic diagram of another correspondence between an output port of each of two levels of splitters and a first optical filter according to this application.

FIG. 6b is a schematic diagram of another correspondence between an output port of each of two levels of splitters and a first optical filter according to this application. Eight output ports of the first-level splitter correspond to eight different first optical filters, and some of eight output ports of the second-level splitter may be identified by using combinations of center wavelengths corresponding to a plurality of first optical filters. The eight different first optical filters corresponding to the eight output ports of the first-level splitter correspond to eight center wavelengths: a center wavelength λ1, a center wavelength λ2, a center wavelength λ3, a center wavelength λ4, a center wavelength λ5, a center wavelength λ6, a center wavelength λ7, and a center wavelength λ8. An output port 1 of the second-level splitter corresponds to a first optical filter 9, an output port 2 of the second-level splitter corresponds to a first optical filter 10, an output port 3 of the second-level splitter corresponds to a first optical filter 11, an output port 4 of the second-level splitter corresponds to the first optical filter 9 and the first optical filter 10, an output port 5 of the second-level splitter corresponds to the first optical filter 9 and the first optical filter 11, an output port 6 of the second-level splitter corresponds to the first optical filter and the first optical filter 11, and an output port 7 of the second-level splitter corresponds to the first optical filter 9, the first optical filter 10, and the first optical filter 11. For details, refer to Table 2.

TABLE 2

Correspondence between an output port of a splitter and a center wavelength

| Output port | First-level splitter | | | | | | | | Second-level splitter | | | | | | |
| --- | --- | --- | --- | --- | --- | --- | --- | --- | --- | --- | --- | --- | --- | --- | --- |
| | #1 | #2 | #3 | #4 | #5 | #6 | #7 | #8 | #1 | #2 | #3 | #4 | #5 | #6 | #7 |
| Center wavelength | λ1 | λ2 | λ3 | λ4 | λ5 | λ6 | λ7 | λ8 | λ9 | λ10 | λ11 | λ9 + λ10 | λ9 + λ11 | λ10 + λ11 | λ9 + λ10 + λ11 |

According to Manner 1, a gain assembly may be disposed only on each output port of the last level of splitter (namely, the second-level splitter). For example, the gain assembly may be disposed following a first optical filter connected to each output port of the second-level splitter. In other words, the first optical filter and the gain assembly are sequentially integrated into each output port of the last level of splitter. Refer to FIG. 6a or FIG. 6b.

It is to be noted that, the gain assembly may alternatively be disposed following a first optical filter connected to each output port of each level of splitter. The gain assembly is disposed only following a first optical filter connected to each output port of the last level of splitter. This helps simplify a process of an optical distribution network.

Manner 2: A first optical filter corresponding to an output port of the first-level splitter is the same as a first optical filter corresponding to an output port of the second-level splitter.

Figure 6C:
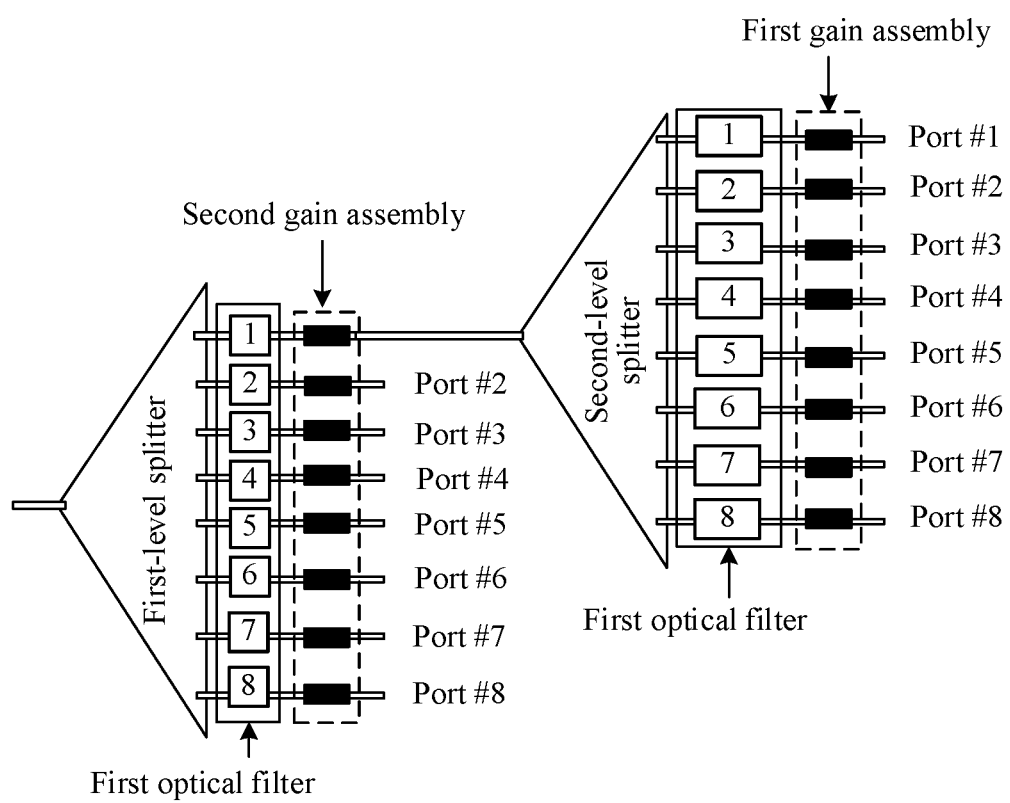
FIG. 6c is a schematic diagram of another correspondence between an output port of each of two levels of splitters and a first optical filter according to this application.

FIG. 6c is a schematic diagram of another correspondence between an output port of each of two levels of splitters and a first optical filter according to this application. Eight output ports of the first-level splitter correspond to eight different first optical filters, and eight output ports of the second-level splitter also correspond to eight different first optical filters. The eight different first optical filters corresponding to the eight output ports of the first-level splitter correspond to eight center wavelengths: a center wavelength λ1, a center wavelength λ2, a center wavelength λ3, a center wavelength λ4, a center wavelength λ5, a center wavelength λ6, a center wavelength λ7, and a center wavelength λ8. The eight different first optical filters corresponding to the eight output ports of the second-level splitter correspond to eight center wavelengths: the center wavelength λ1, the center wavelength λ2, the center wavelength λ3, the center wavelength λ4, the center wavelength λ5, the center wavelength λ6, the center wavelength λ7, and the center wavelength λ8. It may be understood as that eight first optical filters corresponding to eight output ports of a same level of splitter are different, and the eight first optical filters corresponding to the eight output ports of the first-level splitter are the same as the eight first optical filters corresponding to the eight output ports of the second-level splitter. For details, refer to the following Table 3.

TABLE 3

Correspondence between an output port of a splitter and a center wavelength

| Output port | First-level splitter | | | | | | | | Second-level splitter | | | | | | | |
|---|---|---|---|---|---|---|---|---|---|---|---|---|---|---|---|---|
| | #1 | #2 | #3 | #4 | #5 | #6 | #7 | #8 | #1 | #2 | #3 | #4 | #5 | #6 | #7 | #8 |
| Center wavelength | λ1 | λ2 | λ3 | λ4 | λ5 | λ6 | λ7 | λ8 | λ1 | λ2 | λ3 | λ4 | λ5 | λ6 | λ7 | λ8 |

Figure 6D:
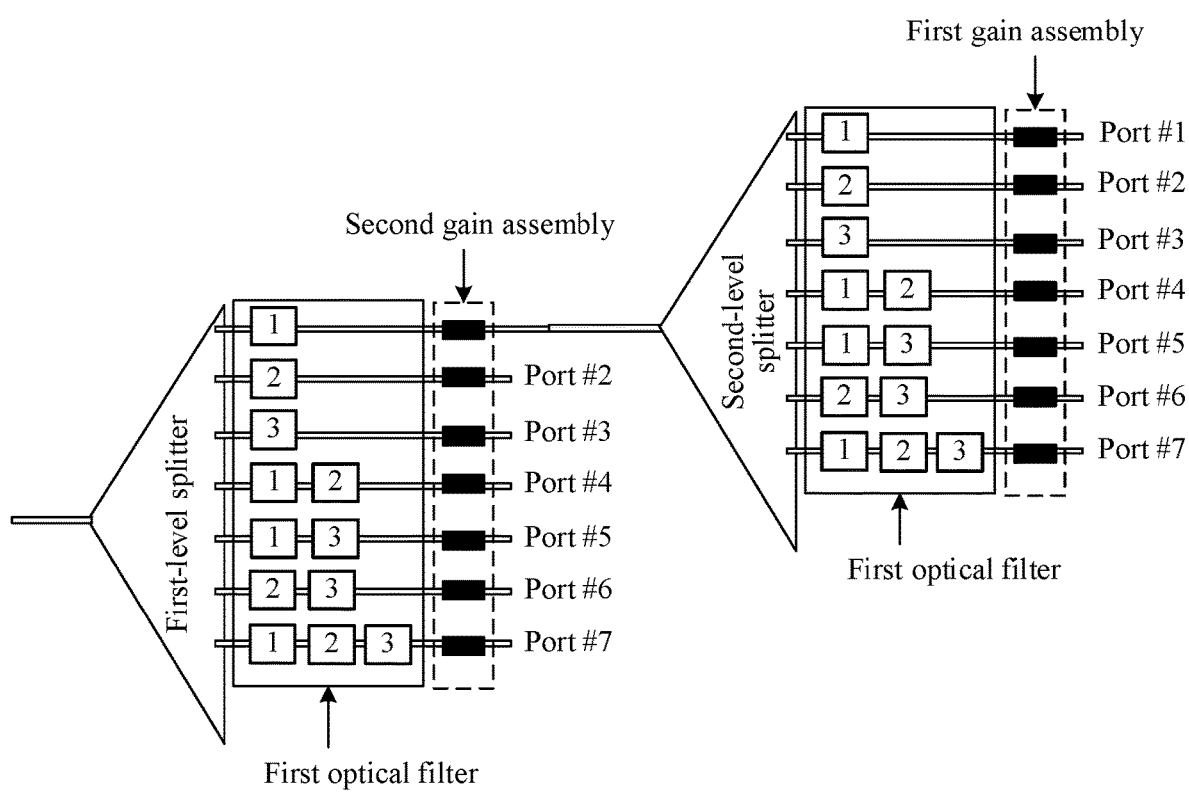
FIG. 6d is a schematic diagram of another correspondence between an output port of each of two levels of splitters and a first optical filter according to this application.

FIG. 6d is a schematic diagram of another correspondence between an output port of each of two levels of splitters and a first optical filter according to this application. An output port 1 of the first-level splitter corresponds to a first optical filter 1, an output port 2 of the first-level splitter corresponds to a first optical filter 2, an output port 3 of the first-level splitter corresponds to a first optical filter 3, an output port 4 of the first-level splitter corresponds to the first optical filter 1 and the first optical filter 2, an output port 5 of the first-level splitter corresponds to the first optical filter 1 and the first optical filter 3, an output port 6 of the first-level splitter corresponds to the first optical filter 2 and the first optical filter 3, and an output port 7 of the first-level splitter corresponds to the first optical filter 1, the first optical filter 2, and the first optical filter 3. An output port 1 of the second-level splitter corresponds to the first optical filter 1, an output port 2 of the second-level splitter corresponds to the first optical filter 2, an output port 3 of the second-level splitter corresponds to the first optical filter 3, an output port 4 of the second-level splitter corresponds to the first optical filter 1 and the first optical filter 2, an output port 5 of the second-level splitter corresponds to the first optical filter 1 and the first optical filter 3, an output port 6 of the second-level splitter corresponds to the first optical filter 2 and the first optical filter 3, and an output port 7 of the second-level splitter corresponds to the first optical filter 1, the first optical filter 2, and the first optical filter 3. For details, refer to Table 4.

each level. In other words, the first optical filter and the gain assembly are sequentially integrated into each output port of each level of splitter. Refer to FIG. 6c or FIG. 6d. For example, a first gain assembly is connected in series to a first optical filter connected to each output port of the second-level splitter, and a second gain assembly is connected in series to a first optical filter connected to each output port of the first-level splitter.

The foregoing Manner 2 helps save wavelength resources, to further reduce specifications of splitters (where in other words, specifications of the first-level splitter and the second-level splitter are the same). In other words, the output port of the first-level splitter and the output port of the second-level splitter are identified by using a same wavelength.

Manner 3: Some of first optical filters corresponding to output ports of the first-level splitter are the same as some of first optical filters corresponding to output ports of the second-level splitter.

Figure 6E:
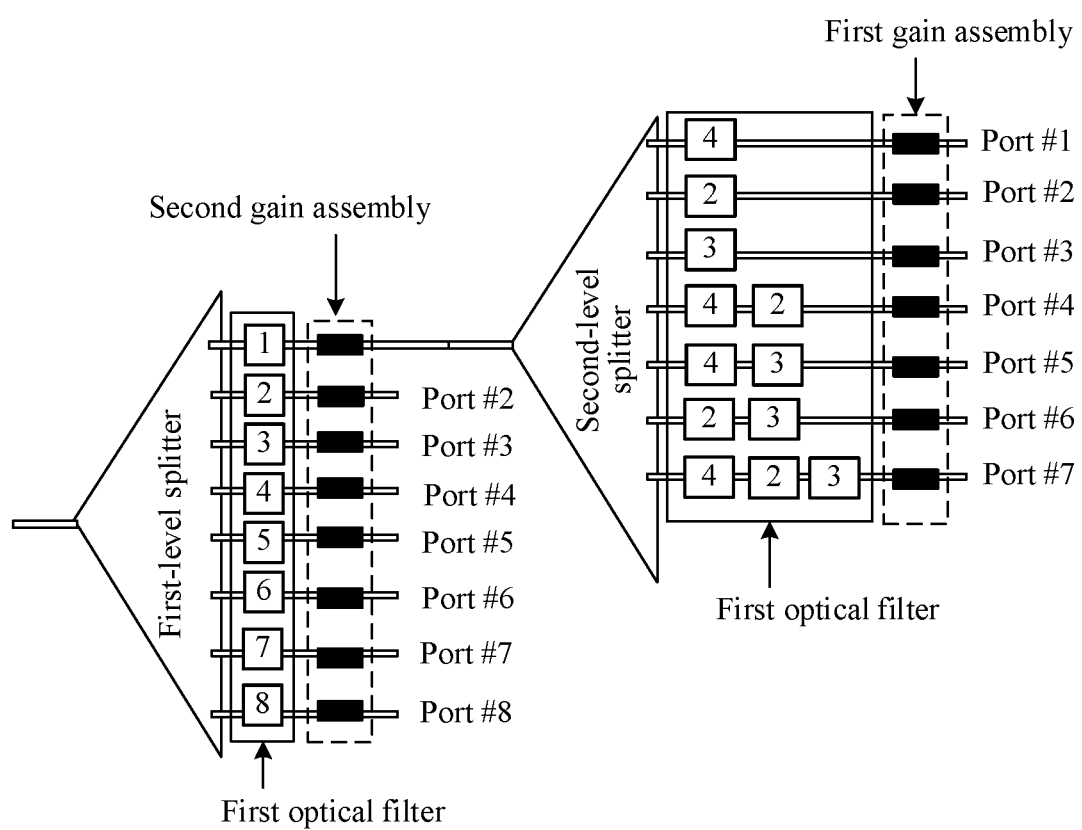
FIG. 6e is a schematic diagram of still another correspondence between an output port of each of two levels of splitters and a first optical filter according to this application.

FIG. 6e is a schematic diagram of still another correspondence between an output port of each of two levels of splitters and a first optical filter according to this application. Eight output ports of the first-level splitter correspond to eight different first optical filters. The eight different first optical filters corresponding to the eight output ports of the first-level splitter correspond to eight center wavelengths: a center wavelength λ1, a center wavelength λ2, a center wavelength λ3, a center wavelength λ4, a center wavelength λ5, a center wavelength λ6, a center wavelength λ7, and a center wavelength λ8. An output port 1 of the second-level splitter corresponds to a first optical filter 4, an output port 2 of the second-level splitter corresponds to a first optical filter 2, an output port 3 of the second-level splitter corresponds to a first optical filter 3, an output port 4 of the second-level splitter corresponds to the first optical filter 2 and the first optical filter 4, an output port 5 of the second-level splitter corresponds to the first optical filter 3 and the

TABLE 4

Correspondence between an output port of a splitter and a center wavelength

| Output port | First-level splitter | | | | | | | Second-level splitter | | | | | | |
|---|---|---|---|---|---|---|---|---|---|---|---|---|---|---|
| | #1 | #2 | #3 | #4 | #5 | #6 | #7 | #1|#2 | #3 | #4 | #5 | #6 | #7 |
| Center wavelength | λ1 | λ2 | λ3 | λ1 + λ2 | λ1 + λ3 | λ2 + λ3 | λ1 + λ2 + λ3 | λ1 | λ2 | λ3 | λ1 + λ2 | λ1 + λ3 | λ2 + λ3 | λ1 + λ2 + λ3 |

According to Manner 2, a gain assembly is disposed on an output port of each level of splitter. For example, the gain assembly may be disposed following a first optical filter at first optical filter 4, an output port 6 of the second-level splitter corresponds to the first optical filter 3 and the first optical filter 2, and an output port 7 of the second-level splitter corresponds to the first optical filter 2, the first optical filter 3, and the first optical filter 4. For details, refer to Table 5.

grated into an output port 2 (a port #2) of the splitter, . . . , and a first optical filter 8 and a gain assembly are sequentially integrated into an output port 8 (a port #8) of the

TABLE 5

Correspondence between an output port of a splitter and a center wavelength

| Output port | First-level splitter | | | | | | | | Second-level splitter | | | | | | |
|---|---|---|---|---|---|---|---|---|---|---|---|---|---|---|---|
| | #1 | #2 | #3 | #4 | #5 | #6 | #7 | #8 | #1 | #2 | #3 | #4 | #5 | #6 | #7 |
| Center wavelength | λ1 | λ2 | λ3 | λ4 | λ5 | λ6 | λ7 | λ8 | λ2 | λ3 | λ4 | λ2 + λ3 | λ2 + λ4 | λ3 + λ4 | λ2 + λ3 + λ4 |

It is to be noted that, there may alternatively be another correspondence between the output port of the second-level splitter and the first optical filter. For example, the output port 1 of the second-level splitter corresponds to the first optical filter 3, the output port 1 of the second-level splitter corresponds to the first optical filter 4, the output port 1 of the second-level splitter corresponds to the first optical filter 2 and the first optical filter 3, the output port 1 of the second-level splitter corresponds to the first optical filter 3 and the first optical filter 4, or the output port 1 of the second-level splitter corresponds to the first optical filter 2, the first optical filter 3, and the first optical filter 4.

It is to be further noted that, three first optical filters connected to the output ports of the second-level splitter may be any three of the seven first optical filters other than the first optical filter 1, and are not limited to the first optical filter 2 to the first optical filter 4. It may also be understood as that the first optical filter connected to the output port of the second-level splitter cannot be the same as a first optical filter corresponding to an output port of a splitter connected to an input port of the second-level splitter. For example, each output port of the second-level splitter connected to the port #1 of the first-level splitter cannot be connected to the first optical filter 1, each output port of the second-level splitter connected to the port #2 of the first-level splitter cannot be connected to the first optical filter 2, and so on.

According to Manner 3, a gain assembly is disposed on an output port of each level of splitter. For example, the gain assembly may be disposed following a first optical filter at each level. In other words, the first optical filter and the gain assembly are sequentially integrated into each output port of each level of splitter. Refer to FIG. 6e. For example, a first gain assembly is connected in series to a first optical filter connected to each output port of the second-level splitter, and a second gain assembly is connected in series to a first optical filter connected to each output port of the first-level splitter.

It should be understood that locations of the first-level splitter and the second-level splitter may alternatively be interchanged.

The following shows examples of three possible implementations of connecting an output port of a splitter, a first optical filter, and a gain assembly.

Implementation 1: The output port of the splitter, the first optical filter, and the gain assembly are integrated together.

Figure 7A:
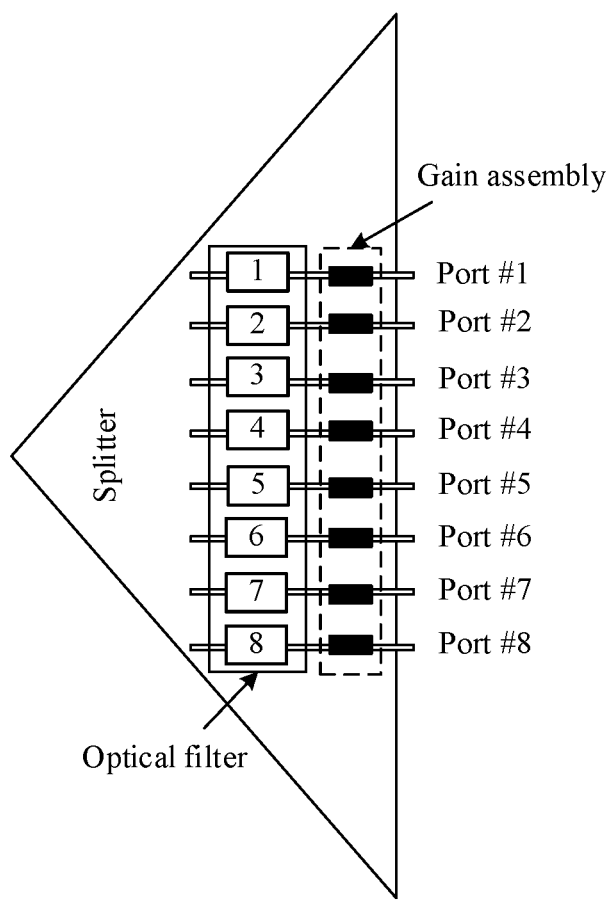
FIG. 7a is a schematic diagram of a manner of connecting an output port of a splitter, a first optical filter, and a gain assembly according to this application.

FIG. 7a is a schematic diagram of a manner of connecting an output port of a splitter, a first optical filter, and a gain assembly according to this application. The first optical filter and the gain assembly are sequentially integrated into the corresponding output port of the splitter, in other words, the output port of the first optical filter, the splitter, and the gain assembly are integrated together. As shown in FIG. 7a, a first optical filter 1 and a gain assembly are sequentially integrated into an output port 1 (a port #1) of the splitter, a first optical filter 2 and a gain assembly are sequentially integrated into an output port 2 (a port #2) of the splitter, . . . , and a first optical filter 8 and a gain assembly are sequentially integrated into an output port 8 (a port #8) of the splitter. By integrating the splitter, the first optical filter, and the gain assembly together, a manufacturing process of an optical distribution network may be simplified.

Implementation 2: The output port of the splitter and the first optical filter are integrated together, and then connected in series to the gain assembly.

Figure 7B:
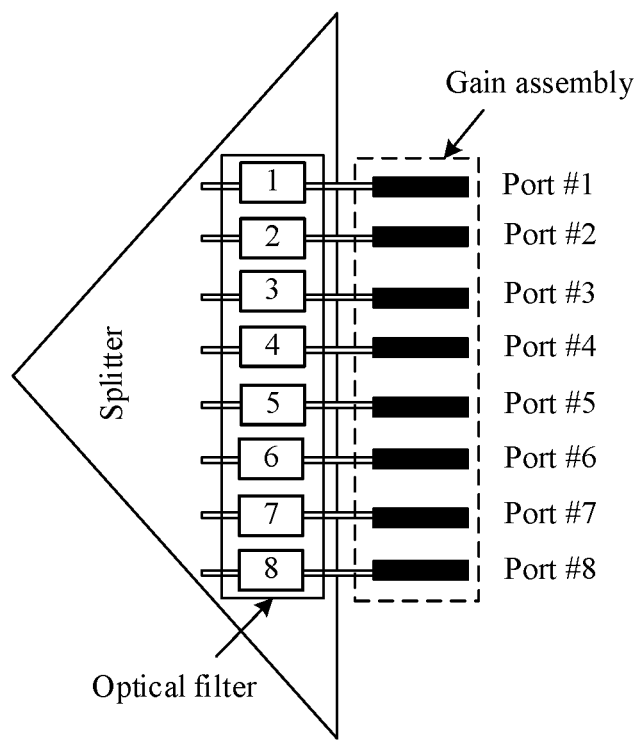
FIG. 7b is a schematic diagram of another manner of connecting an output port of a splitter, a first optical filter, and a gain assembly according to this application.

FIG. 7b is a schematic diagram of another manner of connecting an output port of a splitter, a first optical filter, and a gain assembly according to this application. The first optical filter may be integrated (for example, etched or exposed to ultraviolet) into a scattered fiber of the splitter, and then connected in series (for example, hot melted) to the gain assembly. As shown in FIG. 7b, a first optical filter 1 is integrated into an output port 1 (a port #1) of the splitter, and then connected in series to a gain assembly; a first optical filter 2 is integrated into an output port 2 (a port #2) of the splitter, and then connected in series to a gain assembly; . . . ; a first optical filter 8 is integrated into an output port 8 (a port #8) of the splitter, and then connected in series to a gain assembly.

Implementation 3: The first optical filter is processed on the output port of the splitter, and then connected in series to the gain assembly.

Figure 7C:
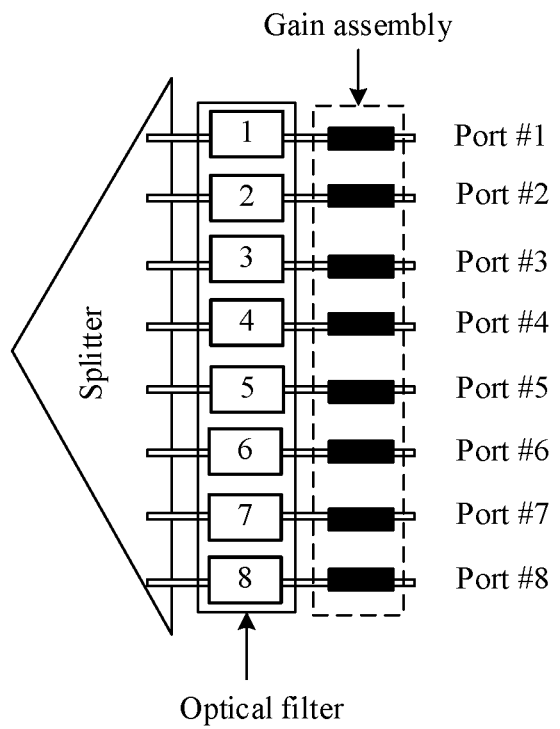
FIG. 7c is a schematic diagram of still another manner of connecting an output port of a splitter, a first optical filter, and a gain assembly according to this application.

FIG. 7c is a schematic diagram of still another manner of connecting an output port of a splitter, a first optical filter, and a gain assembly according to this application. The first optical filter is processed (for example, etched or exposed to ultraviolet) on the output port of the splitter, and then connected in series to the gain assembly.

It is to be noted that gains generated by the gain assemblies corresponding to the output ports of the splitter in the foregoing three implementations may be the same or may be different. This is not limited in this application.

According to the foregoing Implementation 1, a second optical filter may be integrated with the output port of the splitter, the first optical filter, and the gain assembly, or may be connected in series to the output port of the splitter, the first optical filter, and the gain assembly that are integrated together.

According to the foregoing Implementation 2 and Implementation 3, the second optical filter may be connected in series to the gain assembly.

In a possible implementation, the splitter in the foregoing three implementations may be a PLC type splitter.

In a possible implementation, the first power change assembly further corresponds to a second optical filter. The second optical filter is configured to reflect, back to the first power change assembly, the first detection light that is from the first power change assembly.

With reference to FIG. 6a, one end of the first gain assembly is connected to the first optical filter, and the other end of the first gain assembly is connected to the second optical filter. The first gain assembly may amplify the power of the first service light at least twice. This helps improve accuracy of the identified output port of the splitter connected to the optical network terminal.

It is to be noted that one end of the first gain assembly in FIG. 6b, FIG. 6c, FIG. 6d, or FIG. 6e may alternatively be connected to the second optical filter. The foregoing merely uses FIG. 6a as an example. For the second optical filter, refer to the foregoing related descriptions. Details are not described herein again.

It is to be further noted that, in this application, a quantity of ports included in the splitter in the optical distribution network, a cascading manner (for example, single-level or multi-level) of the splitter, a split ratio of the splitter, and the like are not limited. The foregoing embodiments are merely examples for ease of solution description.

Figure 8:
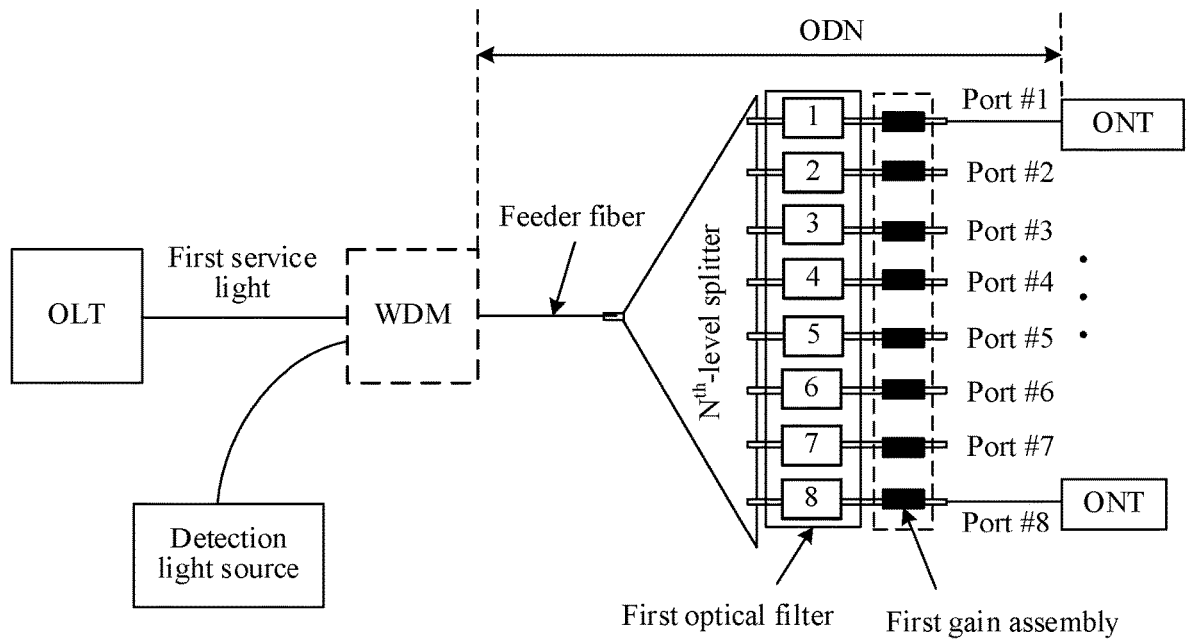
FIG. 8 is a schematic diagram of an architecture of an optical network system according to this application.

Based on the foregoing optical distribution network, FIG. 8 shows an optical network system according to this application. The optical network system may include an optical network terminal and the optical distribution network in any one of the foregoing embodiments. For the optical distribution network, refer to the descriptions in any one of the foregoing embodiments. Details are not described herein again. The optical network terminal is configured to determine a first power of first service light from the optical distribution network and a second power of power-changed first service light, where the first power and the second power are used to determine an output port of a splitter connected to the optical network terminal.

Further, optionally, the optical network system may include an optical line terminal. The optical line terminal is configured to emit the first service light. When a detection light source is not turned on, the first service light is transmitted to the optical network terminal via the optical distribution network, and the optical network terminal may be configured to determine a first power of a received first optical signal. When a detection light source is turned on, the detection light source is used to emit detection light, and the detection light and the first service light may be coupled to the optical distribution network. In the optical distribution network, if a first optical filter allows first detection light to pass through, both the first detection light and the first service light may be transmitted to a first power change assembly. The first power change assembly may be configured to: change the power of the first service light, and transmit power-changed first service light to the optical network terminal. If a first optical filter does not allow first detection light to pass through, only the first service light can be transmitted to a first power change assembly. The first power change assembly does not change the power of the first service light, and may transmit the first service light to the optical network terminal. It should be understood that, if the first power change assembly receives only the first service light, the power of the first service light does not change, and the first service light may be directly transmitted to the optical network terminal.

In a possible implementation, a photoelectric detector in the optical network terminal may determine the first power of the received first service light and the second power of the power-changed first service light.

Based on the optical network system shown in FIG. 8, the following shows examples of two implementations of determining a port of a splitter connected to the optical network terminal.

Implementation 1: The optical line terminal determines the port of the splitter connected to the optical network terminal.

In a possible implementation, the optical line terminal may be configured to: receive the first power and the second power from the optical network terminal, and determine, based on the first power and the second power, the output port of the splitter connected to the optical network terminal.

Further, optionally, the optical line terminal may be configured to: receive the first power and the second power from the optical network terminal; determine a power variation based on the second power and the first power; determine, based on the power variation and a center wavelength of the first detection light, a center wavelength of detection light that the first optical filter allows to pass through or does not allow to pass through; and determine, based on the center wavelength of the detection light that the first optical filter allows to pass through or does not allow to pass through and a correspondence (as shown in any one of the Table 1 to Table 5) between a center wavelength and an output port of a splitter, the output port of the splitter connected to the optical network terminal.

For example, if the first optical filter is a band-stop filter, and the power variation is 0 (in other words, the power remains unchanged), it indicates that a wavelength of detection light that the first optical filter does not allow to pass through is the center wavelength of the first detection light. If the first optical filter is a band-pass filter, and the power changes, it indicates that a wavelength of detection light that the first optical filter allows to pass through is the center wavelength of the first detection light.

Implementation 2: The optical network terminal determines the port of the splitter connected to the optical network terminal.

In a possible implementation, the optical line terminal may be configured to determine, based on the first power and the second power, the output port of the splitter connected to the optical network terminal.

Further, optionally, the optical network terminal may be configured to: determine a power variation based on the first power and the second power; determine, based on the power variation and a center wavelength of the first detection light, a center wavelength of detection light that the first optical filter allows to pass through or does not allow to pass through; and determine, based on the center wavelength of the detection light that the first optical filter allows to pass through or does not allow to pass through and a correspondence (as shown in any one of the Table 1 to Table 5) between a center wavelength and an output port of a splitter, the output port of the splitter connected to the optical network terminal. In this case, the optical network terminal does not need to report the determined first power and second power to the optical line terminal. It is to be noted that, the correspondence between a center wavelength and an output port of a splitter may alternatively be pre-stored in the optical network terminal; or the optical line terminal may send the correspondence (as shown in any one of the Table 1 to Table 5) between a center wavelength and an output port of a splitter to the optical network terminal, and correspondingly, the optical network terminal receives the correspondence between a center wavelength and an output port of a splitter from the optical line terminal.

In a possible implementation, the optical network system may further include a detection light source. The following describes the detection light source.

4. Detection Light Source

In a possible implementation, a minimum quantity of wavelengths that can be emitted by the detection light source is the same as a quantity of center wavelengths corresponding to first optical filters in an optical distribution network.

With reference to FIG. 6a, the detection light source may emit detection light of at least 16 wavelengths, and the 16 center wavelengths of the detection light are respectively a center wavelength $\lambda 1$ to a center wavelength $\lambda 16$. With reference to FIG. 6b, the detection light source may emit detection light of at least 11 wavelengths, and the 11 center wavelengths of the detection light are respectively a center wavelength $\lambda 1$ to a center wavelength $\lambda 11$. With reference to FIG. 6c, the detection light source may emit detection light of at least eight wavelengths, and the eight center wavelengths of the detection light are respectively a center wavelength λ1 to a center wavelength λ8. With reference to FIG. 6d, the detection light source may emit detection light of at least three wavelengths, and the three center wavelengths of the detection light are respectively a center wavelength λ1 to a center wavelength λ3. With reference to FIG. 6e, the detection light source may emit detection light of at least eight center wavelengths, and the eight center wavelengths of the detection light are respectively a center wavelength λ1 to a center wavelength λ8. It should be understood that the detection light source may separately emit detection light of different center wavelengths. For example, the detection light source may emit detection light of one center wavelength at one moment.

The following shows examples of two possible structures of the detection light source.

Structure 1: The detection light source may be a wavelength-tunable light source.

The wavelength-tunable light source means that a wavelength of output detection light can be changed as required. For example, the light source may be a wavelength-tunable continuous wave (CW) light source, or may be a wavelength-tunable pulse light source.

For example, the wavelength-tunable light source may be a wavelength-tunable laser, for example, a distributed feedback (DFB) laser, a Fabry-Perot (FP) laser, or an electro-absorption modulated laser (EML). The following separately provides detailed descriptions.

The DFB laser mainly uses a semiconductor material as a dielectric, including gallium antimony (GaSb), gallium arsenide (GaAs), indium phosphate (InP), zinc sulfide (ZnS), and the like, and has a high side-mode suppression ratio (side-mode suppression ratio, SMSR). The SMSR, referred to as a side-mode suppression ratio, is a ratio of maximum strength of a main mode to maximum strength of a side mode, and is an important indicator of longitudinal mode performance. A grating is integrated in an active layer of the DFB laser, in other words, laser oscillation of the DFB laser is optical coupling formed by the grating. A wavelength of light to be output by the DFB laser may be adjusted by changing magnitude of a current injected into the DFB laser.

A principle of outputting signal light by the EML is the same as a principle of outputting signal light by the DFB laser. To be specific, a wavelength of the light output by the EML may be adjusted by changing magnitude of a current injected into the EML.

A principle of outputting signal light by the FP laser is to emit injection light into an optical resonant cavity of the FP laser, to enforce a lasing wavelength of the optical resonant cavity of the FP laser to be consistent with a wavelength of the injection light. That is, a wavelength of the output light of the FP laser is changed by changing the wavelength of the injection light.

In a possible implementation, a light source may be controlled by using an optical line terminal, so that a wavelength emitted by the light source is tunable.

Structure 2: The detection light source may alternatively be a combination of an optical switch and a detection light source emitting at least one fixed wavelength.

The optical switch may be configured to control one detection light source in the at least one detection light source with a fixed wavelength to output detection light. When a link of the optical switch is in a connected state, a detection light source corresponding to the link may output detection light of a fixed wavelength. When a link of the optical switch is in a disconnected state, a detection light source corresponding to the link cannot output detection light.

Figure 9A:
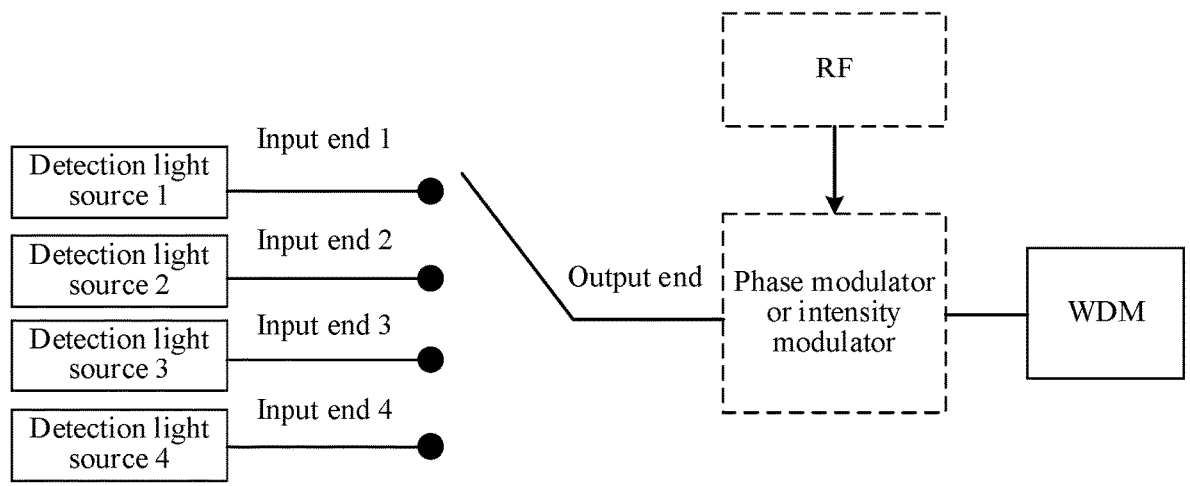
FIG. 9a is a schematic diagram of a structure of a combination of an optical switch and a light source emitting a fixed wavelength according to this application.

FIG. 9a is a schematic diagram of a structure of a combination of an optical switch and a detection light source emitting a fixed wavelength according to this application. The optical switch may be a 4×1 switch, to be specific, including four input ends and one output end. The four input ends of the optical switch are respectively connected to four detection light sources, and the output end of the optical switch is connected to a WDM. To be specific, a detection light source 1 is connected to an input end 1 of the optical switch, a detection light source 2 is connected to an input end 2 of the optical switch, a detection light source 3 is connected to an input end 3 of the optical switch, and a detection light source 4 is connected to an input end 4 of the optical switch. One detection light source may output detection light of one fixed wavelength. To be specific, the detection light source 1 may output detection light of a wavelength 1, the detection light source 2 may output detection light of a wavelength 2, the detection light source 3 may output detection light of a wavelength 3, and the detection light source 4 may output detection light of a wavelength 4. When the input end 1 is connected to the output end, a link of the input end 1 is in a connected state, and therefore, the detection light of the wavelength 1 emitted by the detection light source 1 may be output to the WDM; when the input end 2 is connected to the output end, a link of the input end 2 is in a connected state, and therefore, the detection light of the wavelength 2 emitted by the detection light source 2 may be output to the WDM; and other cases are similar.

Figure 9B:
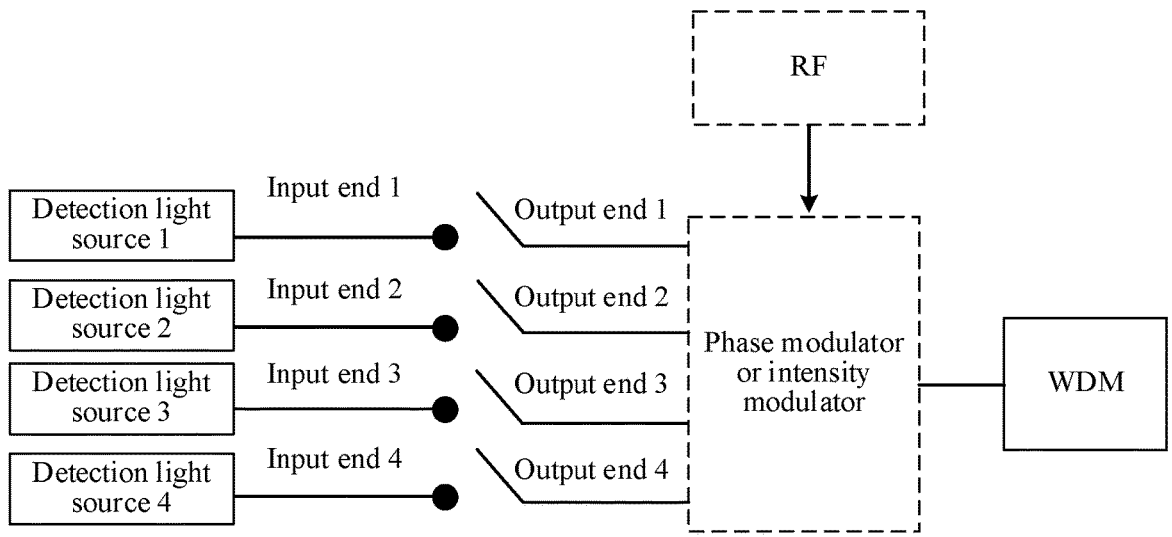
FIG. 9b is a schematic diagram of a structure of another combination of an optical switch and a light source emitting a fixed wavelength according to this application.

FIG. 9b is a schematic diagram of a structure of another combination of an optical switch and a detection light source emitting a fixed wavelength according to this application. The optical switch may be a 4×4 switch, to be specific, including four input ends and four output ends. The four input ends are respectively connected to four detection light sources, and the four output ends are separately connected to a WMD. When an input end 1 is connected to an output end 1, a link of the input end 1 is in a connected state, and therefore, detection light of a wavelength 1 emitted by a detection light source 1 may be output to the WDM; when an input end 2 is connected to an output end 2, a link of the input end 2 is in a connected state, and therefore, detection light of a wavelength 2 emitted by a detection light source 2 may be output to the WDM; and other cases are similar.

Further, optionally, to suppress an SBS effect, a low-frequency phase modulator or intensity modulator and a radio frequency (radio frequency, RF) may be added to the output end of the detection light source. Refer to FIG. 9a or FIG. 9b. The RF may input a modulation signal to the phase modulator or the intensity modulator, to modulate a phase or intensity of detection light with a narrow linewidth emitted by the detection light source, increase the linewidth of the detection light emitted by the detection light source, and further suppress the SBS effect. It should be understood that, when a linewidth of detection light is narrow and a power of a fiber is greater than 8 dBm, the SBS effect occurs in the fiber, to be specific, most of the detection light is dissipated over the fiber.

It is to be noted that, in FIG. 9a or FIG. 9b, phase or intensity modulation performed on the detection light belongs to external modulation. It should be understood that, the phase or intensity modulation performed on the detection light may alternatively be internal modulation, to be specific, the RF may input a modulation signal to the detection light source, to implement internal modulation performed on the phase or intensity of the detection light.

In a possible implementation, the detection light source may be a pump detection light source. The detection light source may select an S band, a C band, or a U band, and a wavelength range of the detection light may be selected based on a center wavelength of each first optical filter in an optical distribution network. A power of the detection light source may be adjusted in a wide range based on an existing network loss and an erbium-doped fiber specification.

Based on the foregoing content, with reference to a specific optical network system, the following provides an implementation process of identifying an output port of a splitter connected to an optical network terminal.

In the following descriptions, for example, an optical network system is a PON system, a first optical filter is a band-stop filter, a manner of integrating the output port of the splitter, the first optical filter, and a gain assembly is the foregoing Implementation 1, and a detection light source is a wavelength-tunable light source. An optical network terminal connected to an output port of a second-level splitter is used as an example.

It is to be noted that, when a wavelength of detection light is the same as a center wavelength corresponding to the first optical filter, the detection light is reflected back to an input port by the first optical filter, the detection light cannot be continuously transmitted to the gain assembly, and only first service light is transmitted to the gain assembly. In this case, the gain assembly does not generate a gain for the first service light. When a wavelength of detection light is different from a center wavelength corresponding to the first optical filter, both the detection light and first service light may be transmitted to the gain assembly. In this case, under the action of the detection light, the gain assembly may generate a gain for the first service light. In other words, the first service light may be amplified by the gain assembly, that is, a power of the first service light also changes. For a principle of amplifying the first service light by the gain assembly, refer to the descriptions in FIG. 1. Details are not described herein again.

Figure 10A:
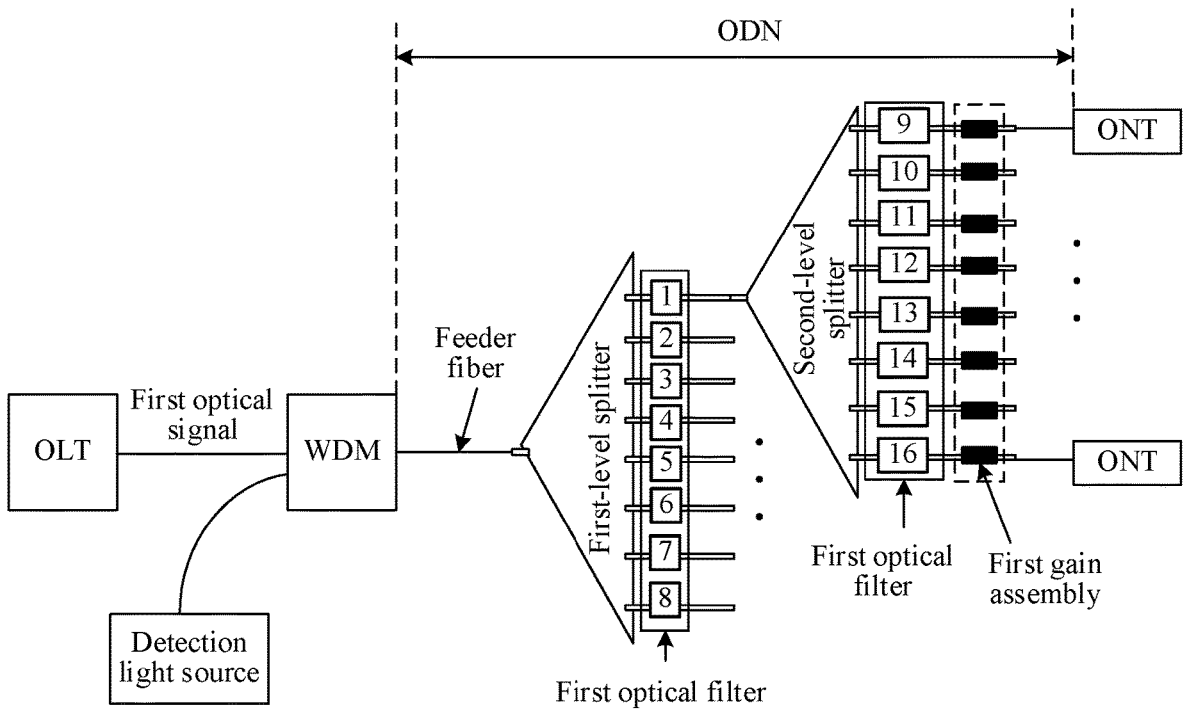
FIG. 10a is a schematic diagram of an architecture of a PON system according to this application.

FIG. 10a is a schematic diagram of an architecture of a PON system according to this application. The PON system may include a detection light source, a WDM, an OLT, an ODN, and ONTs. Two levels of splitters (a first-level splitter and a second-level splitter) are used as an example. For example, there is one second-level splitter, and the ODN is the ODN shown in FIG. 6a (reference may be made to the foregoing related descriptions, and details are not described herein again). The WDM may be configured to: couple received detection light and first service light to a feeder fiber, and transmit the detection light and the first service light to the first-level splitter via the feeder fiber. Each output port of the first-level splitter may be configured to connect to one second-level splitter, and each output port of the second-level splitter may be configured to connect to one ONT.

When the detection light source is not turned on, the ONT is configured to: receive the first service light from the OLT, and determine a first power P0 of the first service light. It should be understood that, when the first service light passes through a first gain assembly, the first gain assembly does not generate a gain for the first service light. Further, the ONT is configured to report the first power P0 of the first service light to the OLT.

When the detection light source is turned on, the detection light source may be used to separately emit detection light of wavelengths λ1 to λ16 at different moments. In other words, at one moment, the detection light source may emit detection light of one center wavelength. For example, detection light of the center wavelength λ1 is emitted at a moment t1, detection light of the center wavelength λ2 is emitted at a moment t2, detection light of the center wavelength λ3 is emitted at a moment t3, . . . , detection light of the center wavelength λ15 is emitted at a moment t15, and detection light of the center wavelength λ16 is emitted at a moment t16.

When the center wavelength of the detection light is λ1, the ONT determines a second power P1 of received power-changed first service light; when the center wavelength of the detection light is λ2, the ONT determines a second power P2 of received power-changed first service light; . . . ; when the center wavelength of the detection light is λ15, the ONT determines a second power P15 of received power-changed first service light; when the center wavelength of the detection light is λ16, the ONT determines a second power P16 of received power-changed first service light.

Further, optionally, the ONT is configured to report the determined second power to the OLT, as shown in Table 6. In a possible implementation, the ONT may report one second power to the OLT each time the ONT determines the second power; or the ONT may report 16 second powers to the OLT together after determining the 16 second powers. In addition, the ONT may report the first power and the second power to the OLT together, or may first report the first power and then report the second power. This is not limited in this application.

TABLE 6

| Second power reported by the ONT to the OLT when the detection light source is turned on | | | | | | | | | | | | | | | |
|---|---|---|---|---|---|---|---|---|---|---|---|---|---|---|---|
| Center wavelength of the detection light | λ1 | λ2 | λ3 | λ4 | λ5 | λ6 | λ7 | λ8 | λ9 | λ10 | λ11 | λ12 | λ13 | λ14 | λ15 | λ16 |
| Power | P1 | P2 | P3 | P4 | P5 | P6 | P7 | P8 | P9 | P10 | P11 | P12 | P13 | P14 | P15 | P16 |

Correspondingly, the OLT is configured to: receive the second powers from the ONT, where the second powers are respectively the second power P1, the second power P2, the second power P3, the second power P4, the second power P5, the second power P6, the second power P7, the second power P8, the second power P9, the second power P10, the second power P11, the second power P12, the second power P13, the second power P14, the second power P15, and the second power P16; receive the first power P0 from the ONT; and separately calculate a power variation ΔPn, where ΔPn=Pn−P0, and a value of n ranges from 1 to 16.

Further, the OLT may be configured to determine, based on the power variation ΔPn, an output port of a splitter connected to the ONT. In a possible implementation, the power variation ΔPn may be compared with a resolution or a determining threshold (for example, Δm, which may be set to 0.3 dB) of the PON system, to determine whether powers of signal light received by the OLT change when the detection light source is turned on and when the detection light source is not turned on. If ΔPn≥Δm, ΔPn is recorded as "1", indicating that the power of the first service light changes by one unit under detection light of the wavelength. It indicates that both the detection light of the wavelength λn and the first service light enter the first gain assembly, and further indicates that a first optical filter corresponding to the output port of the splitter allows the detection light of the wavelength λn to pass through. If ΔPn<Δm, ΔPn may be recorded as "0", indicating that the power of the first service light does not change under detection light of the wavelength. It indicates that the detection light of the wavelength λn and the first service light do not enter the first gain assembly together, and a first optical filter corresponding to the output port of the splitter does not allow (or reflects) the detection light of the wavelength λn to pass through. Further, it may be determined that a center wavelength corresponding to the first optical filter is also λn. Therefore, the output port of the splitter connected to the ONT may be determined based on a correspondence (as shown in the foregoing Table 1) between an output port of a splitter and a center wavelength.

It is to be noted that, ΔPn may alternatively be greater than Δm, and ΔPn is recorded as "1". If ΔPn≤Δm, ΔPn is recorded as "0".

In a possible implementation, the OLT may determine, based on ΔP1 to ΔP8, an output port of a first-level splitter connected to the ONT, and determine, based on ΔP9 to ΔP16, an output port of a second-level splitter connected to the ONT.

For example, ΔP1 to ΔP8 are respectively 01111111. To be specific, when the center wavelength of the detection light is λ1, a power of signal light received by the ONT does not change. When the center wavelength of the detection light is λ2, the center wavelength of the detection light is λ3, the center wavelength of the detection light is λ4, the center wavelength of the detection light is λ5, the center wavelength of the detection light is λ6, the center wavelength of the detection light is λ7, or the center wavelength of the detection light is λ8, a power of signal light received by the ONT changes. When the center wavelength of the detection light is the same as the center wavelength corresponding to the first optical filter, the detection light is reflected back to an input end by the first optical filter. Therefore, the power of the signal light received by the ONT does not change. Therefore, the OLT may determine that the center wavelength corresponding to the first optical filter connected to the ONT is λ1, may determine, based on a correspondence (as shown in Table 1) between a center wavelength and an output port of a splitter, that the center wavelength λ1 corresponds to an output port 1 (a port #1) of the first-level splitter, and further determine that the ONT is connected to the port #1 of the first-level splitter.

Further, when the center wavelength of the detection light is λ2, the center wavelength of the detection light is λ3, the center wavelength of the detection light is λ4, the center wavelength of the detection light is λ5, the center wavelength of the detection light is λ6, the center wavelength of the detection light is λ7, or the center wavelength of the detection light is λ8, both the detection light and the first service light arrive at the gain assembly. It indicates that each of the detection light of the seven wavelengths is different from the center wavelength corresponding to the first optical filter. Therefore, the power of the signal light received by the ONT changes. Therefore, the OLT may determine that the ONT is not connected to a port #2, a port #3, a port #4, a port #5, a port #6, a port #7, or a port #8 of the first-level splitter.

For example, ΔP9 to ΔP16 are respectively 01111111. To be specific, when the center wavelength of the detection light is λ9, a power of signal light received by the ONT does not change. When the center wavelength of the detection light is λ10, the center wavelength of the detection light is λ11, the center wavelength of the detection light is λ12, the center wavelength of the detection light is λ13, the center wavelength of the detection light is λ14, the center wavelength of the detection light is λ15, or the center wavelength of the detection light is λ16, a power of signal light received by the ONT changes. Based on the same principle, the OLT may determine that the center wavelength corresponding to the first optical filter connected to the ONT is λ9, may determine, based on a correspondence (as shown in Table 1) between a center wavelength and an output port of a splitter, that an output port of the second-level splitter corresponding to the center wavelength λ9 is a port #1, and further determine that the ONT is connected to the port #1 of the second-level splitter.

Further, when the center wavelength of the detection light is λ10, the center wavelength of the detection light is λ11, the center wavelength of the detection light is λ12, the center wavelength of the detection light is λ13, the center wavelength of the detection light is λ14, the center wavelength of the detection light is λ15, or the center wavelength of the detection light is λ16, both the detection light and the first service light arrive at the gain assembly. It indicates that each of the detection light of the seven wavelengths is different from the center wavelength corresponding to the first optical filter. Therefore, the power of the signal light received by the ONT changes. Therefore, the OLT may determine that the ONT is not connected to a port #2, a port #3, a port #4, a port #5, a port #6, a port #7, and a port #8 of the second-level splitter.

Based on the foregoing content, when determining that the power variations ΔP1 to ΔP16 are 0111111101111111, the OLT may further determine that the ONT is connected to the port #1 of the first-level splitter and the port #1 of the second-level splitter.

Figure 10B:
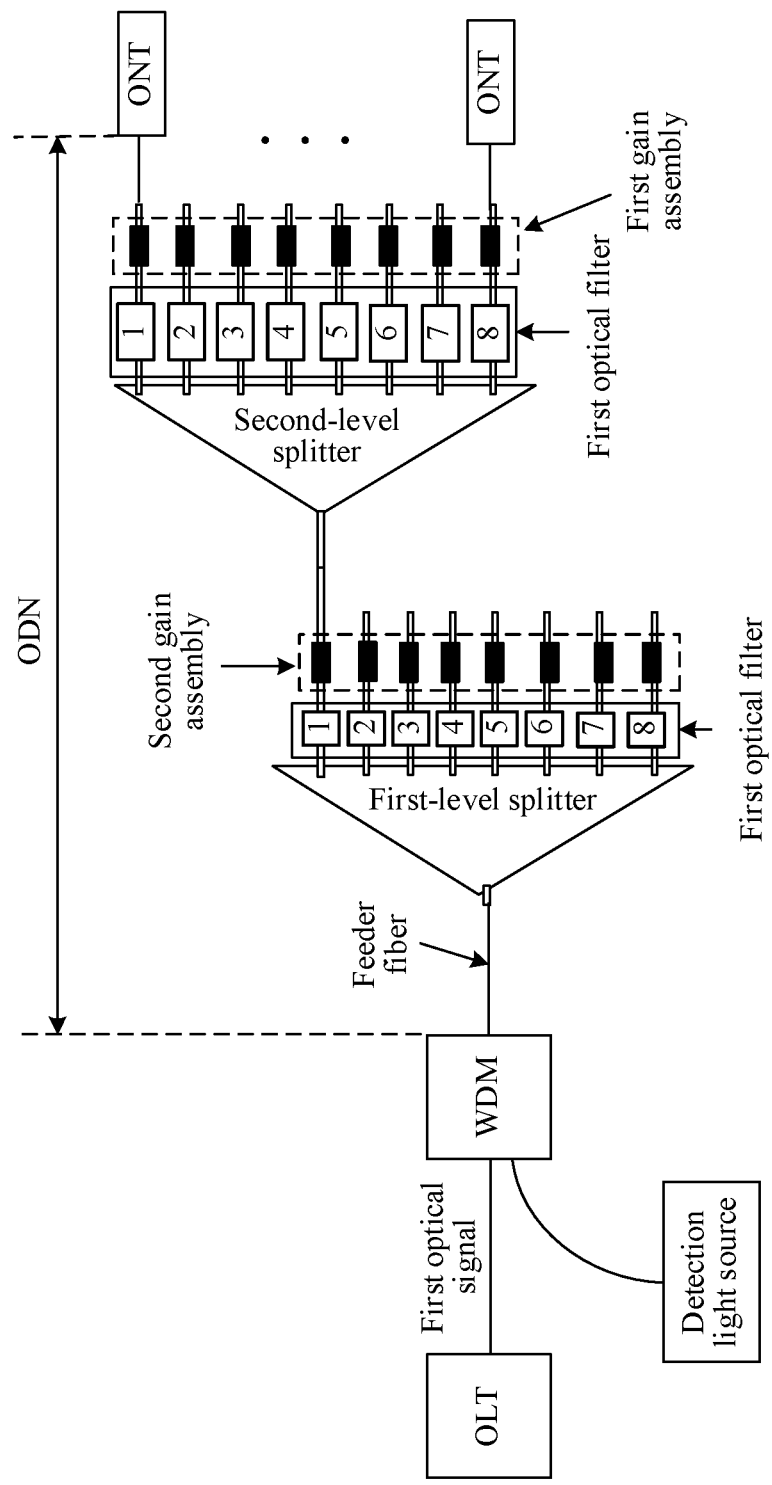
FIG. 10b is a schematic diagram of an architecture of a PON system according to this application.

FIG. 10b is a schematic diagram of an architecture of another PON system according to this application. The PON system may include a detection light source, a WDM, an OLT, an ODN, and ONTs. Two levels of splitters (namely, a first-level splitter and a second-level splitter) are used as an example. For example, there is one second-level splitter, and the ODN is the ODN shown in FIG. 6c (reference is made to the foregoing related descriptions, and details are not described herein again). The WDM may be configured to: couple received detection light and first service light to a feeder fiber, and transmit the detection light and the first service light to the first-level splitter via the feeder fiber. Each output port of the first-level splitter may be configured to connect to one second-level splitter, and each output port of the second-level splitter may be configured to connect to one ONT.

When the detection light source is not turned on, the ONT is configured to: receive the first service light from the OLT, and determine a first power P0 of the first service light. It should be understood that, when the first service light passes through a first gain assembly, the first gain assembly does not generate a gain for the first service light. Further, the ONT is configured to report the first power P0 of the first service light to the OLT.

When the detection light source is turned on, the detection light source may be used to separately emit detection light of wavelengths λ1 to λ8 at different moments. In other words, at one moment, the detection light source may emit detection light of one center wavelength. For example, detection light of the center wavelength λ1 is emitted at a moment t1, detection light of the center wavelength λ2 is emitted at a moment t2, detection light of the center wavelength λ3 is emitted at a moment t3, . . . , detection light of the center wavelength λ7 is emitted at a moment t7, and detection light of the center wavelength λ8 is emitted at a moment t8.

When the center wavelength of the detection light is λ1, the ONT determines a second power P1 of received power-changed first service light; when the center wavelength of the detection light is λ2, the ONT determines a second power P2 of received power-changed first service light; . . . ; when the center wavelength of the detection light is λ8, the ONT determines a second power P8 of received power-changed first service light.

Further, optionally, the ONT is configured to report the determined second power to the OLT, as shown in Table 7. In a possible implementation, the ONT may report one second power to the OLT each time the ONT determines the second power; or the ONT may report eight second powers to the OLT together after determining the eight second powers. In addition, the ONT may report the first power and the second power to the OLT together, or may first report the first power and then report the second power. This is not limited in this application.

TABLE 7

Second power reported by the ONT to the OLT when the detection light source is turned on

| Center wavelength of the detection light | λ1 | λ2 | λ3 | λ4 | λ5 | λ6 | λ7 | λ8 |
|---|---|---|---|---|---|---|---|---|
| Power | P1 | P2 | P3 | P4 | P5 | P6 | P7 | P8 |

Correspondingly, the OLT is configured to: receive the second powers from the ONT, where the second powers are respectively the second power P1, the second power P2, the second power P3, the second power P4, the second power P5, the second power P6, the second power P7, and the second power P8; receive the first power P0 from the ONT; and separately calculate a power variation ΔPn, where ΔPn=Pn−P0, and a value of n ranges from 1 to 8.

Further, the OLT may be configured to determine, based on the power variation ΔPn, an output port of a splitter connected to the ONT. In a possible implementation, the power variation ΔPn may be compared with a resolution or a determining threshold (for example, Δm, which may be set to 0.3 dB) of the PON system, to determine whether powers of signal light received by the OLT change in the cases that the detection light source is turned on and the detection light source is not turned on. If ΔPn=0, it indicates that the power of the first service light does not change under detection light of the wavelength. To be specific, the detection light of the wavelength λn and the first service light do not enter the first gain assembly together, and the detection light of the wavelength λn is not transmitted to a second gain assembly. It further indicates that the detection light of the wavelength λn is reflected back to an input end by a first optical filter corresponding to the output port of the first splitter, and it may be further determined that a center wavelength corresponding to the first optical filter corresponding to the output port of the first-level splitter is λn, so that an output port of the first-level splitter connected to the ONT can be determined based on a correspondence (as shown in Table 1) between an output port of a splitter and a center wavelength. If ΔPn=Δm, ΔPn may be recorded as "1", indicating that the power of the first service light changes by one unit under detection light of the wavelength. It indicates that both the detection light of the wavelength λn and the first service light enter a second gain assembly connected to the first-level splitter, and further indicates that a first optical filter corresponding to the output port of the first-level splitter allows the detection light of the wavelength λn to pass through. If ΔPn=2Δm, ΔPn may be recorded as "2", indicating that the power of the first service light changes by two units under detection light of the wavelength. It indicates that both the detection light and the first service light arrive at a second gain assembly connected to the first-level splitter and a first gain assembly connected to the second-level splitter.

It should be understood that, when both the detection light and the first service light are transmitted to the second gain assembly connected to the first-level splitter, the detection light and the first service light act once, and the power of the first service light is amplified by Δm. When the detection light and the first service light are transmitted to the first gain assembly connected to the second-level splitter, the first service light is amplified by Δm again. In other words, if the detection light and the first service light can be transmitted to both the first gain assembly and the second gain assembly, the first service light is amplified by 2Δm.

For example, ΔP1 to ΔP8 are respectively 02222222. To be specific, when the center wavelength of the detection light is λ1, a power of signal light received by the ONT does not change. When the center wavelength of the detection light is λ2, the center wavelength of the detection light is λ3, the center wavelength of the detection light is λ4, the center wavelength of the detection light is λ5, the center wavelength of the detection light is λ6, the center wavelength of the detection light is λ7, or the center wavelength of the detection light is λ8, a power of signal light received by the ONT changes. When the center wavelength of the detection light is the same as the center wavelength corresponding to the first optical filter, the detection light is reflected back to the input end by the first optical filter. Therefore, the power of the signal light received by the ONT does not change. Therefore, the OLT may determine that the center wavelength corresponding to the first optical filter connected to the ONT is λ1, may determine, based on a correspondence (as shown in Table 1) between a center wavelength and an output port of a splitter, that the center wavelength λ1 corresponds to an output port 1 (a port #1) of the first-level splitter, and corresponds to an output port 1 (a port #1) of the second-level splitter.

Further, when the center wavelength of the detection light is λ2, the center wavelength of the detection light is λ3, the center wavelength of the detection light is λ4, the center wavelength of the detection light is λ5, the center wavelength of the detection light is λ6, the center wavelength of the detection light is λ7, or the center wavelength of the detection light is λ8, both the detection light and the first service light arrive at the second gain assembly connected to the first-level splitter and the first gain assembly connected to the second-level splitter. It indicates that each of the seven center wavelengths of the detection light is different from the center wavelength corresponding to the first optical filter. Therefore, the power of the signal light received by the ONT changes. The OLT may determine that the ONT is not connected to a port #2, a port #3, a port #4, a port #5, a port #6, a port #7, or a port #8 of the first-level splitter, and may further determine that the ONT is not connected to a port #2, a port #3, a port #4, a port #5, a port #6, a port #7, or a port #8 of the second-level splitter, either.

Based on the foregoing content, when determining that the power variations ΔP1 to ΔP8 are respectively 02222222, the OLT may determine that the ONT is connected to the port #1 of the first-level splitter and the port #1 of the second-level splitter.

For example, ΔP1 to ΔP8 are respectively 12222220. To be specific, when the center wavelength of the detection light is λ1, a power of signal light received by the ONT changes by one unit. When the center wavelength of the detection light is λ2, the center wavelength of the detection light is λ3, the center wavelength of the detection light is λ4, the center wavelength of the detection light is λ5, the center wavelength of the detection light is λ6, or the center wavelength of the detection light is λ7, the power of the first service light received by the ONT changes by two units. When the center wavelength of the detection light is λ8, the power of the first service light received by the ONT does not change. The OLT may determine, based on ΔP8=0, that the detection light of wavelength λ8 is reflected back to the input end by the first optical filter of the first-level splitter and cannot arrive at the second-level splitter. Therefore, it may be determined that the center wavelength corresponding to the first optical filter corresponding to the output port of the first-level splitter connected to the ONT is λ8. Further, the OLT may determine, based on a correspondence (as shown in Table 3) between a center wavelength and an output port of a splitter, that the center wavelength λ8 corresponds to a port #8 of the first-level splitter. The OLT may determine, based on ΔP1=1, that the first service light generates a gain only in the second gain assembly connected to the first-level splitter, and is reflected back by a first optical filter corresponding to the output port of the second-level splitter. Therefore, it may be determined that the center wavelength corresponding to the first optical filter corresponding to the output port of the first-level splitter connected to the ONT is λ1. With reference to a correspondence (as shown in Table 2) between a center wavelength and an output port of a splitter, the OLT may determine that the center wavelength λ1 corresponds to a port #1 of the second-level splitter.

Further, when the center wavelength of the detection light is λ2, the center wavelength of the detection light is λ3, the center wavelength of the detection light is λ4, the center wavelength of the detection light is λ5, the center wavelength of the detection light is λ6, or the center wavelength of the detection light is λ7, the power of the first service light received by the ONT changes by two units. That is, under the detection light of the six wavelengths, the detection light and the first service light arrive at the second gain assembly connected to the first-level splitter and the first gain assembly connected to the second-level splitter. It indicates that each of the detection light of the six wavelengths is different from the center wavelength corresponding to the first optical filter. Therefore, the power of the first service light received by the ONT changes by two units. The OLT may determine that the ONT is not connected to a port #2, a port #3, a port #4, a port #5, a port #6, or a port #7 of the first-level splitter, and may further determine that the ONT is not connected to a port #2, a port #3, a port #4, a port #5, a port #6, or a port #7 of the second-level splitter, either.

Based on the foregoing content, when determining that the power variations ΔP1 to ΔP8 are respectively 12222220, the OLT may determine that the ONT is connected to the port #8 of the first-level splitter and the port #1 of the second-level splitter.

It is to be noted that Δm may be a specific value, an interval, or a function.

Figure 10C:
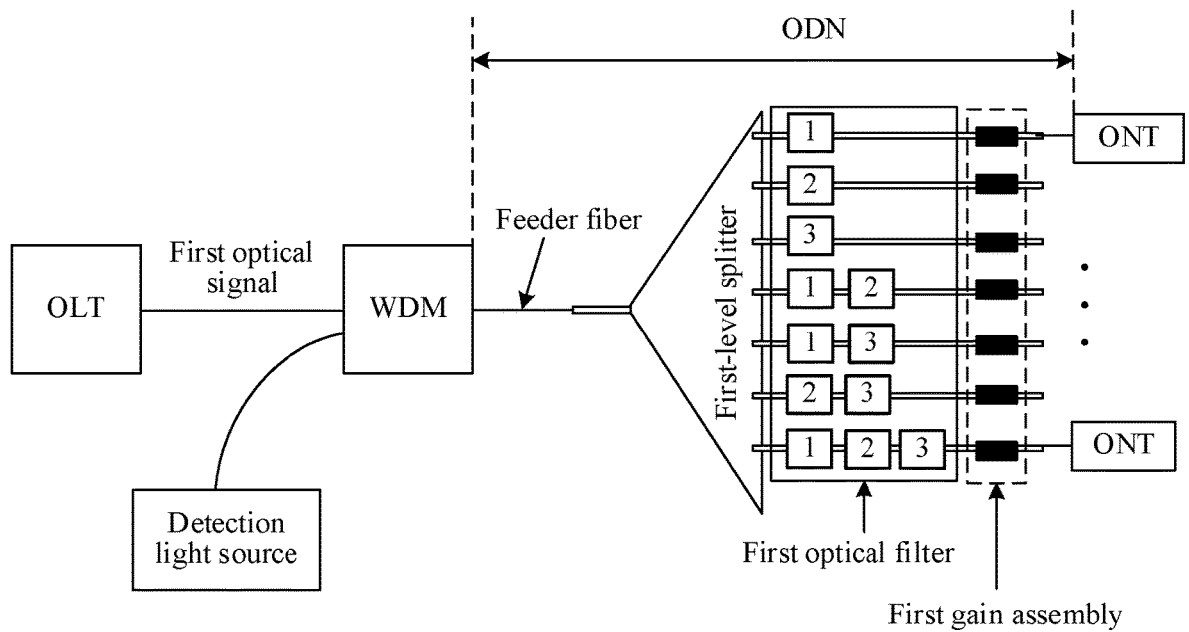
FIG. 10c is a schematic diagram of an architecture of a PON system according to this application.

FIG. 10c is a schematic diagram of still another PON system according to this application. The PON system may include a detection light source, a WDM, an OLT, an ODN, and ONTs. For example, the ODN is the ODN shown in FIG. 5b (reference is made to the foregoing related descriptions, and details are not described herein again). The WDM may be configured to: couple received detection light and first service light to a feeder fiber, and transmit the detection light and the first service light to a first-level splitter via the feeder fiber. Each output port of the first-level splitter may be configured to connect to one second-level splitter, and each output port of the second-level splitter may be configured to connect to one ONT.

When the detection light source is not turned on, the ONT is configured to: receive the first service light from the OLT, and determine a first power P0 of the first service light. It should be understood that, when the first service light passes through a first gain assembly, the first gain assembly does not generate a gain for the first service light. Further, the ONT is configured to report the first power P0 of the first service light to the OLT.

When the detection light source is turned on, the detection light source may be used to separately emit detection light of wavelengths λ1 to λ3 at different moments. In other words, at one moment, the detection light source may emit detection light of one center wavelength. For example, detection light of the center wavelength λ1 is emitted at a moment t1, detection light of the center wavelength λ2 is emitted at a moment t2, and detection light of the center wavelength λ3 is emitted at a moment t3.

When the center wavelength of the detection light is λ1, the ONT determines a second power P1 of received power-changed first service light; when the center wavelength of the detection light is λ2, the ONT determines a second power P2 of received power-changed first service light; when the center wavelength of the detection light is λ3, the ONT determines a second power P3 of received power-changed first service light.

Further, optionally, the ONT is configured to report the determined second power to the OLT. Correspondingly, the OLT may receive the second power from the ONT. For details, refer to the foregoing related descriptions. Details are not described herein again.

Further, the OLT may be configured to determine, based on a power variation ΔPn, an output port of a splitter connected to the ONT. In a possible implementation, the power variation ΔPn may be compared with a resolution or a determining threshold (for example, Δm, which may be set to 0.3 dB) of the PON system, to determine whether powers of signal light received by the OLT change when the detection light source is turned on and when the detection light source is not turned on. For a value recorded in ΔPn, refer to the foregoing related descriptions. Details are not described herein again.

For example, the ONT is connected to an output port 1 of the second-level splitter, and corresponding power variations are: ΔP1=P1−P0=0, ΔP2=P2−P0=1, and ΔP3=P3−P0=1. That is, ΔP1 to ΔP3 are respectively 011. In other words, when the OLT determines that the power variations ΔP1 to ΔP3 are respectively on, it may be determined that the ONT is connected to the #1 port of the second-level splitter.

For another example, the ONT is connected to an output port 7 of the second-level splitter, and corresponding power variations are: ΔP1=P1−P0=0, ΔP2=P2−P0=0, and ΔP3=P3−P0=0. That is, ΔP1 to ΔP3 are respectively 000. In other words, when the OLT determines that the power variations ΔP1 to ΔP3 are respectively 000, it may be determined that the ONT is connected to the #7 port of the second-level splitter.

It is to be noted that, the foregoing tables indicating correspondences are merely examples, and may indicate similar correspondences or correspondence sets in an implementation process.

It is to be further noted that, when the second-level splitter includes eight ports, seven of the ports may be identified, and the eighth port may be determined according to an exclusion method.

Based on the foregoing content and a same concept, this application provides a method for identifying a port of a splitter. Refer to descriptions in FIG. 1i. The method for identifying the port of the splitter may be applied to the PON system shown in any one of embodiments in FIG. 8 to FIG. 10c. It may also be understood as that the method for identifying the port of the splitter may be implemented based on the PON system shown in any one of embodiments in FIG. 8 to FIG. 10c.

Figure 11:
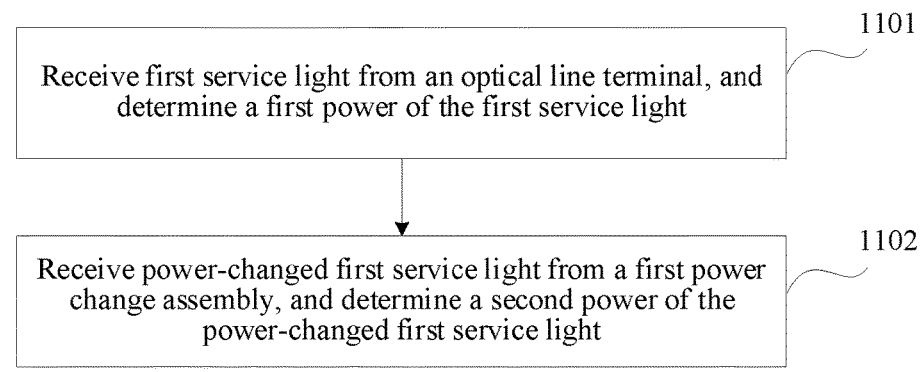
FIG. 11 is a schematic flowchart of a method for identifying an output port of a splitter according to this application.

FIG. 11 is a schematic flowchart of a method for identifying a port of a splitter according to this application. The method may be applied to the optical network system according to any one of the foregoing embodiments. The method includes the following steps.

Step 1101: Receive first service light from an optical line terminal, and determine a first power of the first service light.

Herein, the first service light from the optical line terminal may be received when a detection light source is not turned on.

Step 1102: Receive power-changed first service light from a first power change assembly, and determine a second power of the power-changed first service light.

The power-changed first service light is obtained by changing the power of the first service light based on received first detection light by the first power change assembly, a center wavelength of the first detection light is a center wavelength that a first optical filter corresponding to the first power change assembly allows to pass through, and center wavelengths of detection light that different first optical filters allow to pass through or do not allow to pass through are different. The first power and the second power may be used to determine an output port of a splitter connected to an optical network terminal.

Herein, the power-changed first service light is obtained by changing the power of the first service light based on the received first detection light by the first power change assembly. In other words, after the detection light source is turned on, detection light emitted by the detection light source is transmitted to the first power change assembly together with the first service light after passing through the corresponding first optical filter, and the first power change assembly may change the power of the first service light, so that the power-changed first service light can be obtained.

Both step 1101 and step 1102 may be performed by the optical network terminal. For details, refer to the foregoing related descriptions. Details are not described herein again.

In a possible implementation, determining, based on the first power and the second power, the output port of the splitter connected to the optical network terminal may be performed by the optical network terminal, or may be performed by the optical line terminal. For details, refer to the foregoing related descriptions. Details are not described herein again.

Further, optionally, a power variation may be determined based on the second power and the first power; a center wavelength of detection light that the first optical filter allows to pass through or does not allow to pass through is determined based on the power variation and the center wavelength of the first detection light; and the output port of the splitter connected to the optical network terminal is determined based on the center wavelength of the detection light that the first optical filter allows to pass through or does not allow to pass through and a correspondence between a center wavelength and an output port of a splitter.

It can be learned from step 1101 and step 1102 that, the center wavelengths of the detection light that the different first optical filters allow to pass through or do not allow to pass through are different. When both the detection light and the first service light are transmitted to the first power change assembly, the first power change assembly may change the power of the first service light. When only the first service light is transmitted to the first power change assembly, the first power change assembly does not change the power of the first service light, so that a center wavelength of corresponding detection light can be determined based on the power of the first service light, a corresponding first optical filter can be determined based on the center wavelength of the detection light, and a port of a splitter connected to the optical network terminal can be further determined based on the determined first optical filter.

In the foregoing embodiments, the gain assembly may alternatively be replaced with an attenuation assembly, and the gain assembly and the attenuation assembly may be collectively referred to as a power change assembly.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "evenness" does not mean absolute evenness, and an engineering error is allowable, for example, as mentioned above, "good channel evenness". "Equal to" does not mean absolute equal to, and an engineering error is allowable. For example, the foregoing mentioned "photon energy of the detection light is equal to an energy difference between the E3/E2 energy level and the E1 energy level", and for another example, the foregoing mentioned "energy of input signal light is equal to an energy difference between the E2 energy level and the E1 energy level". "At least one" means one or more, and "a plurality of" means two or more, for example, the foregoing mentioned "at least one first optical filter". For another example, the foregoing mentioned "at least one fixed wavelength". The term "and/or" describes an association relationship between associated objects, and represents that three relationships may exist. For example, A and/or B may represent the following cases: Only A exists, both A and B exist, and only B exists, where A and B may be singular or plural. An example is, as mentioned above, "a detection light source may be a wavelength-tunable light source, and/or a combination of an optical switch and a light source emitting at least one fixed wavelength". In the text descriptions of this application, the character "/" usually indicates an "or" relationship between associated objects, for example, "E3/E2 energy level" mentioned above. In addition, in this application, the word "example" is used to represent giving an example, an illustration, or a description. Any embodiment or design scheme described as an "example" in this application should not be explained as being more preferred or having more advantages than another embodiment or design scheme. Alternatively, it may be understood as that the word "example" is used to present a concept in a specific manner, and does not constitute a limitation on this application. In this application, a power of an optical signal may also be referred to as an optical power.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes. The terms "first", "second", and the like are used to distinguish between similar objects, but do not necessarily indicate a specific order or sequence. In addition, the terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

Although this application is described with reference to specific features and embodiments thereof, it is clear that various modifications and combinations may be made to them without departing from the scope of this application. Correspondingly, the specification and accompanying drawings are merely examples for description of the solutions defined by the appended claims, and are considered as any of or all modifications, variations, combinations or equivalents that cover the scope of this application.

It is clear that a person skilled in the art can make various modifications and variations to this application without departing from the scope of the present invention. This application is intended to cover these modifications and variations provided that they fall within the scope of protection defined by the following claims and their equivalent technologies.

What is claimed is:

1. An optical distribution network, comprising:

N levels of splitters, wherein each level of the N levels of splitters comprises at least one splitter, each splitter of the at least one splitter of each level comprises at least two output ports;

M first optical filters, wherein each output port of the at least two output ports of each splitter corresponds to at least one first optical filter, different output ports correspond to different first optical filters, and center wavelengths of detection light that the different first optical filters allow to pass through or do not allow to pass through are different; and K first power change assemblies, wherein N, M, and K are all positive integers, each output port of each splitter in an $N^{th}$-level splitter further corresponds to a respective first power change assembly, each first power change assembly is configured to change a power of first service light from an optical line terminal based on received first detection light, and the $N^{th}$-level splitter is one of the N levels of splitters that is configured to connect to an optical network terminal; and wherein each first power change assembly being configured to change the power of first service light from the optical line terminal based on the received first detection light comprises each first power change assembly being configured to:

when both the first detection light and the first service light are transmitted to the respective gain assembly, amplify the first service light and output amplified first service light; and when only the first service light is transmitted to the gain respective assembly, not generate any gain for the first service light and output the first service light.

2. The optical distribution network according to claim 1, wherein N is an integer greater than 1;

a first optical filter corresponding to any output port of a $J^{th}$-level splitter is different from a first optical filter corresponding to any output port of an $H^{th}$-level splitter, wherein both J and K are positive integers; and the $J^{th}$-level splitter and the $H^{th}$-level splitter are any two of the N levels of splitters.

3. The optical distribution network according to claim 1, wherein N is an integer greater than 1;

an output port of each splitter in an $L^{th}$-level splitter corresponds to a respective second power change assembly, and the $L^{th}$-level splitter is a splitter other than the $N^{th}$-level splitter in the N levels of splitters, wherein L is a positive integer; and each second power change assembly is configured to change the power of the first service light from the optical line terminal based on received second detection light.

4. The optical distribution network according to claim 3, wherein at least one first power change assembly is a first gain assembly, and at least one second power change assembly is a second gain assembly; or at least one first power change assembly is a first attenuation assembly, and at least one second power change assembly is a second attenuation assembly.

5. The optical distribution network according to claim 3, wherein at least one first power change assembly is a first gain assembly, and at least one second power change assembly is a second gain assembly.

6. The optical distribution network according to claim 3, wherein at least one first power change assembly is a first attenuation assembly, and at least one second power change assembly is a second attenuation assembly.

7. The optical distribution network according to claim 1, wherein an $i^{th}$ output port, a first optical filter corresponding to the $i^{th}$ output port, and a first power change assembly corresponding to the $i^{th}$ output port or a second power change assembly corresponding to the $i^{th}$ output port are connected in any one of the following manners:

the $i^{th}$ output port, the first optical filter corresponding to the $i^{th}$ output port, and the first power change assembly corresponding to the $i^{th}$ output port or the second power change assembly corresponding to the $i^{th}$ output port are sequentially integrated together;

the first optical filter corresponding to the $i^{th}$ output port is integrated into the $i^{th}$ output port, and the first power change assembly corresponding to the $i^{th}$ output port or the second power change assembly corresponding to the $i^{th}$ output port is connected in series to the integrated first optical filter corresponding to the $i^{th}$ output port; or the first optical filter corresponding to the $i^{th}$ output port is connected in series to the $i^{th}$ output port, and the first power change assembly corresponding to the $i^{th}$ output port or the second power change assembly corresponding to the $i^{th}$ output port is connected in series to the first optical filter corresponding to the $i^{th}$ output port; and wherein the $i^{th}$ output port is any one of at least two output ports of any splitter in the N levels of splitters, and i is a positive integer.

8. The optical distribution network according to claim 1, wherein each first power change assembly further corresponds to a respective second optical filter; and each second optical filter is configured to reflect, back to the corresponding first power change assembly, the first detection light from the first power change assembly.

9. The optical distribution network according to claim 1, wherein center wavelengths of detection light that the different first optical filters allow to pass through are different.

10. The optical distribution network according to claim 1, wherein center wavelengths of detection light that the different first optical filters do not allow to pass through are different.

11. An optical network system, comprising:

an optical network terminal, configured to determine a first power of first service light from an optical distribution network and a second power of power-changed first service light, wherein the first power and the second power are used to determine an output port of a splitter of the optical distribution network connected to the optical network terminal; and the optical distribution network, comprising:

N levels of splitters, wherein each level of the N levels of splitters comprises at least one splitter, each splitter of the at least one splitter of each level comprises at least two output ports;

M first optical filters, wherein each output port of the at least two output ports of each splitter corresponds to at least one first optical filter, different output ports correspond to different first optical filters, and center wavelengths of detection light that the different first optical filters allow to pass through or do not allow to pass through are different; and K first power change assemblies, wherein N, M, and K are all positive integers, each output port of each splitter in an $N^{th}$-level splitter further corresponds to a respective first power change assembly, each first power change assembly is configured to change a power of the first service light from an optical line terminal based on received first detection light, and the $N^{th}$-level splitter is one of the N levels of splitters that is configured to connect to the optical network terminal.

12. The optical network system according to claim 11, wherein the optical network system further comprises:
the optical line terminal, configured to:
  receive the first power and the second power from the optical network terminal;
  determine a power variation based on the first power and the second power;
  determine, based on the power variation and a center wavelength of first detection light, a center wavelength of detection light that a corresponding first optical filter allows to pass through or does not allow to pass through; and
  determine, based on the center wavelength of the detection light that the corresponding first optical filter allows to pass through or does not allow to pass through and a correspondence between a center wavelengths and output ports of splitters of the N levels of splitters, the output port of the splitter connected to the optical network terminal.

13. The optical network system according to claim 11, wherein the optical network terminal is further configured to:
  determine a power variation based on the first power and the second power;
  determine, based on the power variation and a center wavelength of first detection light, a center wavelength of detection light that a corresponding first optical filter allows to pass through or does not allow to pass through; and
  determine, based on the center wavelength of the detection light that the corresponding first optical filter allows to pass through or does not allow to pass through and a correspondence between center wavelengths and output ports of splitters of the N levels of splitters, the output port of the splitter connected to the optical network terminal.

14. The optical network system according to claim 11, wherein a detection light source is a wavelength-tunable light source.

15. The optical network system according to claim 11, wherein a detection light source is a combination of an optical switch and a light source emitting at least one fixed wavelength, wherein the optical switch is configured to control one of the light sources emitting at least one fixed wavelength to output detection light, and a center wavelength of the detection light output by the light source corresponds to a center wavelength that a first optical filter allows to pass through or does not allow to pass through.

16. The optical network system according to claim 11, wherein a detection light source is a combination of:
  a wavelength-tunable light source; and
  a combination of an optical switch and a light source emitting at least one fixed wavelength, wherein the optical switch is configured to control one of the light sources emitting at least one fixed wavelength to output detection light, and a center wavelength of the detection light output by the light source corresponds to a center wavelength that a first optical filter allows to pass through or does not allow to pass through.

17. A splitter, comprising:
at least two output ports and at least one first optical filter corresponding to each of the at least two output ports, wherein different output ports correspond to different first optical filters, and center wavelengths of detection light that the different first optical filters allow to pass through or do not allow to pass through are different; and
a power change assembly, configured to change a power of first service light from an optical line terminal based on received first detection light, wherein the power change assembly being configured to change the power of first service light from the optical line terminal based on the received first detection light comprises the power change assembly being configured to:
  when both the first detection light and the first service light are transmitted to the power change assembly, amplify the first service light and output amplified first service light; and
  when only the first service light is transmitted to the power change assembly, not generate any gain for the first service light and output the first service light.

18. The splitter according to claim 17, wherein the power change assembly is a gain assembly.

19. The splitter according to claim 17, wherein the power change assembly is an attenuation assembly.

20. The splitter according to claim 17, wherein the at least one first optical filter comprises at least two first optical filters.

* * * * *